United States Patent [19]
Ramsey et al.

[11] Patent Number: 6,041,401
[45] Date of Patent: *Mar. 21, 2000

[54] COMPUTER SYSTEM THAT PLACES A CACHE MEMORY INTO LOW POWER MODE IN RESPONSE TO SPECIAL BUS CYCLES EXECUTED ON THE BUS

[75] Inventors: Jens K. Ramsey, Houston; Jeffrey C. Stevens, Spring; Michael E. Tubbs, Montgomery; Charles J. Stancil, Tomball, all of Tex.

[73] Assignee: Compaq Computer Corporation, Houston, Tex.

[ * ] Notice: This patent is subject to a terminal disclaimer.

[21] Appl. No.: 09/032,429

[22] Filed: Feb. 27, 1998

Related U.S. Application Data

[63] Continuation of application No. 08/703,927, Aug. 28, 1996, Pat. No. 5,813,022, which is a continuation of application No. 08/323,110, Oct. 14, 1994, abandoned.

[51] Int. Cl.[7] .................................................. G06F 12/00
[52] U.S. Cl. .............................. 712/43; 712/39; 712/229; 713/323
[58] Field of Search .................................. 712/1, 32, 36, 712/39, 40, 43, 14, 229; 713/320, 300, 323

[56] References Cited

U.S. PATENT DOCUMENTS

| | | | |
|---|---|---|---|
| 4,758,945 | 7/1988 | Remedi | 395/750 |
| 4,980,836 | 12/1990 | Carter et al. | 395/375 |
| 5,012,406 | 4/1991 | Martin | 395/750 |
| 5,167,024 | 11/1992 | Smith et al. | 712/200 |
| 5,230,074 | 7/1993 | Canova, Jr. et al. | 395/750 |
| 5,247,642 | 9/1993 | Kadlee et al. | 395/403 |
| 5,384,747 | 1/1995 | Clohset | 365/226 |
| 5,386,552 | 1/1995 | Garney | 395/575 |
| 5,392,417 | 2/1995 | Iuengu et al. | 395/455 |
| 5,420,808 | 5/1995 | Alexander et al. | 364/707 |
| 5,430,683 | 7/1995 | Hardin et al. | 365/227 |
| 5,432,967 | 7/1995 | Doi | 395/750 |
| 5,452,434 | 9/1995 | MacDonald | 395/550 |
| 5,457,790 | 10/1995 | Iwanura et al. | 395/494 |
| 5,471,625 | 11/1995 | Mussemann et al. | 395/750 |
| 5,481,731 | 1/1996 | Conary et al. | 395/750 |
| 5,813,022 | 9/1998 | Ramsey et al. | 711/3 |

FOREIGN PATENT DOCUMENTS 5-324141 of 1993 Japan .

OTHER PUBLICATIONS

IBM Technical Disclosure Bulletin, vol. 37, No. 04B (Apr. 1994), pp. 633–634, © IBM Corp. 1994.
Intel DX4 Processor Data Book, Intel Corp., pp. 1–11, 7–12 to 7–21, 8–29 to 8–32 (Feb. 1994).
Motorola Semiconductor Technical Data: 32K×9 Bit Burst Ram, Synchronous Static Ram, pp. 4–10 to 4–19 (1993).
Pentium Processor User's Manual, vol. 1: Pentium Processor Data Book, Intel Corp., pp. 1=111.6–28 to 6–30 (1994).

*Primary Examiner*—John A. Follansbee
*Assistant Examiner*—Dzong C Nguyen
*Attorney, Agent, or Firm*—Sharp, Comfort & Merrett, P.C.

[57] ABSTRACT

A circuit for placing an external or L2 cache memory into low power mode in response to certain special cycles executed by the microprocessor. In particular, the special cycles are the stop grant acknowledge special cycle and the halt special cycle. The microprocessor executes the stop grant acknowledge special cycle in response to a request by the computer system to slow down its clock. This request is asserted by the computer system if the system has been idle for a predetermined period of time. The halt special cycle is generated by the microprocessor when a HALT instruction is executed. The stop grant acknowledge and halt special cycles place the microprocessor into a low power state. Since the microprocessor is in low power mode, the L2 cache memory is also placed into low power mode for further power conservation. The L2 cache memory is implemented either with synchronous or asynchronous static random access memories (SRAMs). To place a synchronous SRAM into low power mode, its address strobe input is asserted while its chip select input is deasserted. For an asynchronous SRAM, deasserting its chip select input causes the SRAM to transition into low power mode.

5 Claims, 10 Drawing Sheets

COMPUTER SYSTEM THAT PLACES A CACHE MEMORY INTO LOW POWER MODE IN RESPONSE TO SPECIAL BUS CYCLES EXECUTED ON THE BUS

This is a continuation of application Ser. No. 08/703,927 filed Aug. 28, 1996, now U.S. Pat. No. 5,813,022, which is a continuation of patent application Ser. No. 08/323,110, filed on Oct. 14, 1994, abandoned, both of which are hereby incorporated by reference.

BACKGROUND OF THE INVENTION

1. Field of the Invention

The invention relates to a technique for conserving power in computer systems, and more particularly, to circuitry that responds to certain special bus cycles by placing cache memory devices in the computer system into low power mode.

2. Description of the Related Art

Rapid improvements in integrated circuit components have led to more powerful computer systems. The first generation of IC components was built using bipolar technology. However, bipolar devices dissipated large amounts of power, which proved to be an obstacle to manufacturing larger and denser components. Next, IC components were manufactured with metal-oxide-silicon (MOS) technology. But it was not until the development of complementary metal-oxide-silicon (CMOS) devices before the IC industry began its rapid growth. CMOS components dissipate relatively low power when they are not in active operation. As a result, the transition to CMOS technology has enabled the manufacture of denser and more powerful IC components, while maintaining relatively low power consumption.

However, even with the use of CMOS technology, power dissipation by the computer system components still causes significant amounts of energy to be wasted, particularly when the computer system is powered on but not in use. Heretofore, efforts have concentrated on stopping or slowing down the clock to the main microprocessor and turning off peripheral devices such as disk drives, video systems and I/O ports to conserve power. Such an apparatus for reducing computer system power consumption is described in U.S. Pat. No. 4,980,836, entitled "Apparatus for Reducing Computer System Power Consumption," by Carter, et al. Carter describes a computer system that monitors its address bus to determine when selected peripheral devices have not been accessed for a preset amount of time. When the preset amount of time has expired, the computer system powers itself down and stops the system clock. In addition, the keyboard electronics are placed into low power mode and power is removed from various miscellaneous logic. However, the memory devices remained powered up to retain programs. Later advances allowed powering off even the memory devices by storing the entire system state to hard disk before completely powering down. But this is a final step and power conservation is desired at all levels and periods, not just after very long periods.

As microprocessor clock speeds have rapidly increased, the gap between the microprocessor cycle time and the access time for a memory has also increased. Mainly due to cost reasons, computer manufacturers implement main memory systems with dynamic random access memories (DRAMs). DRAM access times have been unable to keep pace with microprocessor cycle times, which requires that wait states be inserted any time data has to by transferred between the microprocessor and main memory. To improve performance, cache memory systems are implemented between the microprocessor and the main memory. Cache memory systems are usually implemented with fast SRAMs, which allow data to be accessed by microprocessors without the need for wait states. Cache memory stores blocks of data retrieved from main memory. Thus, any access to the cache memory that results in a hit would save considerable amounts of time. A cache miss will still require data to be retrieved from main memory.

Because of the very high speeds of the devices, cache memory systems consume significant amounts of power. As the size of cache memory systems increases, the power consumption also increases. This has been a large area of power consumption in high performance computer systems, but energy savings are desired in even these high performance systems. As a result, it is desirable that the power dissipation of these cache devices be reduced whenever possible to aid in the overall reduction of power being consumed.

SUMMARY OF THE INVENTION

A circuit according to the present invention responds to certain computer special cycles by placing the cache memory system into low power mode. In particular, the preferred embodiment responds to a stop grant acknowledge special cycle and a halt special cycle. The stop grant special cycle is preferably asserted by the microprocessor when a signal, referred to as a stop clock signal, indicating a request to slow down or stop the computer system clock signal, is asserted. The stop clock signal is asserted whenever the system detects that it has been idle for a predetermined period of time. The halt special cycle is preferably generated by the microprocessor in response to a halt instruction executed by the microprocessor, which causes the microprocessor to cease operation and enter a low power state. In both such cycles, the operation of the microprocessor has either been slowed down or stopped. As a result, the cache memory system is not in use and thus is placed into low power mode to conserve energy. Another feature of the present invention is that the microprocessor and cache memory system are temporarily taken out of low power mode to perform certain cache consistency cycles and placed back into low power mode after the cycles have completed.

BRIEF DESCRIPTION OF THE DRAWINGS

A better understanding of the present invention can be obtained when the following detailed description of the specific embodiment is considered in conjunction with the following drawings, in which.

DETAILED DESCRIPTION OF THE SPECIFIC EMBODIMENT

The following disclosures are hereby incorporated by reference:

U.S. application Ser. No. 08/324,016, entitled "Single Bank, Multiple Way Cache Memory," by Sompong P. Olarig, Jens K. Ramsey, and Michael J. Collins, filed Oct. 14, 1994 now U.S. Pat. No. 5,835,948;

U.S. application Ser. No. 08/324,246, entitled "Memory Controller With Write Posting Queues for Processor and I/O Bus Operations and Ordering Logic for Controlling the Queues," by Michael J. Collins, Gary W. Thome, Michael Moriarty, Jens K. Ramsey, and John E. Larson, filed Oct. 14, 1994 now U.S. Pat. No. 5,634,073;

U.S. application Ser. No. 08/323,263, entitled "Data Error Detection and Correction System," by William J. Walker and Alan L. Goodrum, filed Oct. 14, 1994 now U.S. Pat. No. 5,555,250;

U.S. application Ser. No. 08/324,020, entitled "Circuit for Invalidating Portions of a Cache Memory if a Write Occurs to a Write Protected Area of Main Memory" by Jens K. Ramsey, filed Oct. 14, 1994 now abandoned; and U.S. application Ser. No. 08/324,011, entitled "System for Arbitrating Access to Memory" by John E. Larson, Michael Moriarty, Michael J. Collins and Gary W. Thome, filed Oct. 14, 1994 now U.S. Pat. No. 5,524,235; all of which are assigned to the assignee of this invention.

Figure 1:
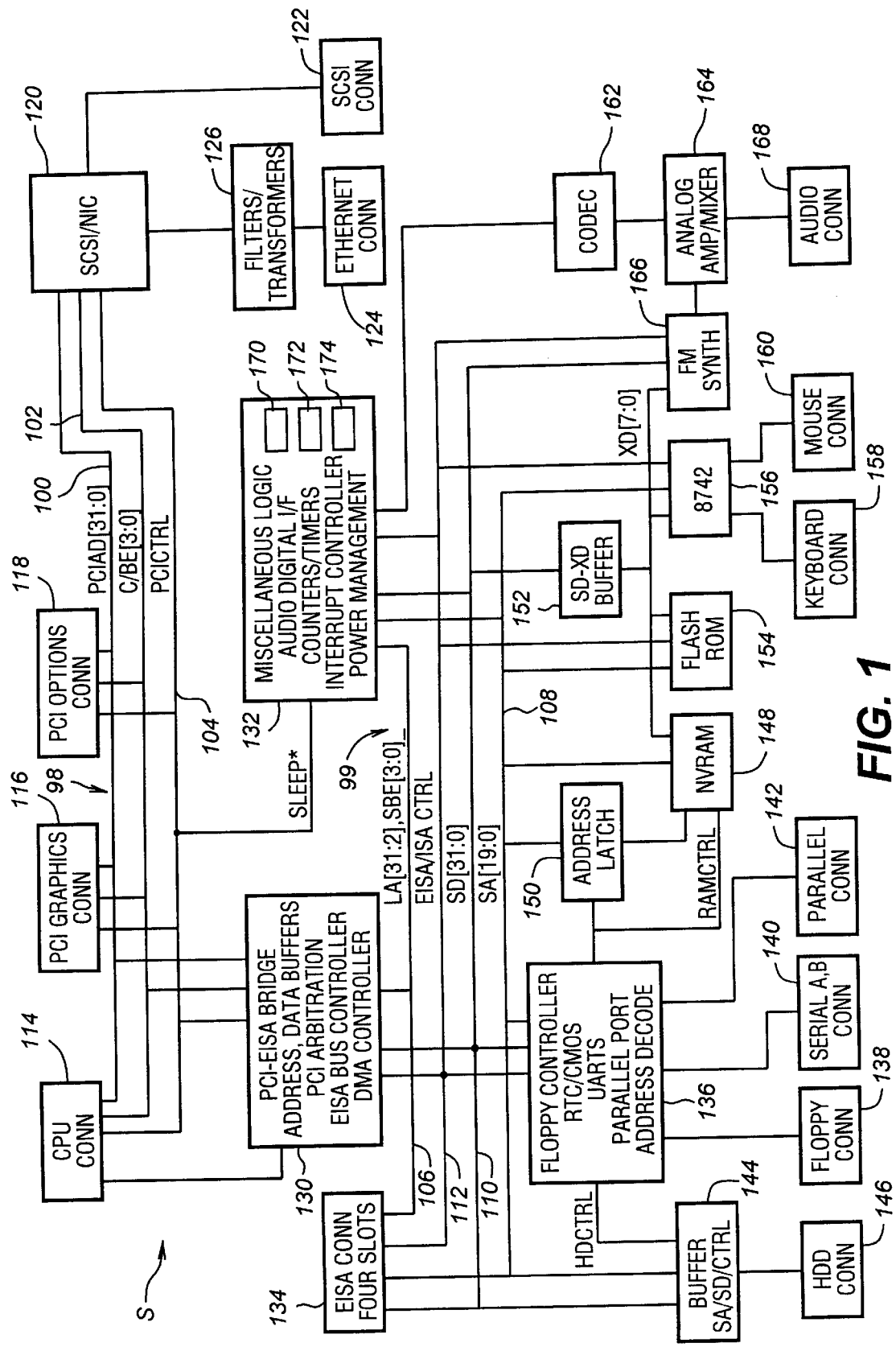
FIG. 1 is a block diagram of the system board of an exemplary computer system.

Referring now to FIG. 1, the system board S of an exemplary computer system incorporating the preferred embodiment of the present invention is shown. In the preferred embodiment, the system board S contains circuitry and slots for receiving interchangeable circuit boards. In the preferred embodiment, there are two primary buses located on the system board S. The first bus is the PCI or Peripheral Component Interconnect bus 98 which includes address/data portion 100, also referred to as PCIAD, control and byte enable portion 102 and control signal portion 104. The address/data bus PCIAD is preferably 32 bits wide, although it can be upgraded to 64 bits if desired. The second primary bus on the system board S is the EISA bus 99. The EISA bus 99 includes LA address portion 106, SA address portion 108, SD data portion 110 and EISA/ISA control signal portion 112. The PCI and EISA buses 98 and 99 form the backbones of the system board S.

Figure 2:
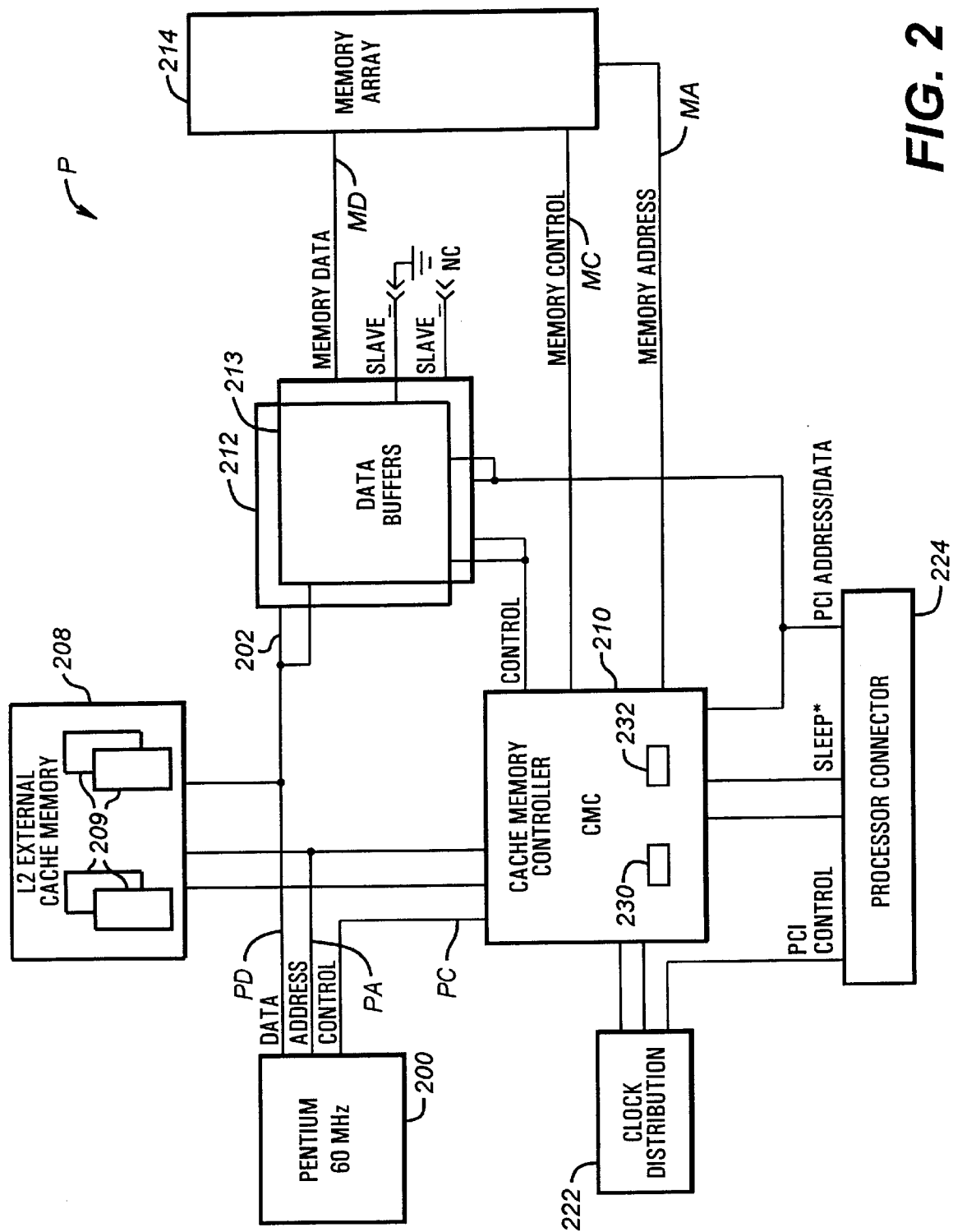
FIG. 2 is a block diagram of a processor board for connection to the system board of FIG. 1.

A CPU connector 114 is connected to the PCI bus 98 to receive a processor card, such as that shown in FIG. 2. A PCI graphics connector 116 is connected to the PCI bus 98 to receive a video graphics card (not shown). The graphics card provides video signals to an external monitor (not shown). A PCI option connector 118 is also connected to the PCI bus 98 to receive any additional cards designed according to the PCI standard. In addition, a SCSI and network interface (NIC) controller 120 is connected to the PCI bus 98. Preferably, the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system board S and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus 99. In the preferred embodiment, the miscellaneous system logic chip 132 is implemented as an ASIC. The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry.

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive (not shown). A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

The miscellaneous logic chip 132 in the preferred embodiment performs three power management functions:

hard drive spin down, monitor suspend, and microprocessor slow down. A counter 170 in the miscellaneous logic chip 132 triggers the hard drive spin down, and a counter 172 triggers the suspension of the monitor. The counters 170 and 172 are reloaded with predetermined values every time one of the following events occur in the system: a hardware interrupt level is asserted; various I/O reads or writes to the hard disk drive, floppy disk drive, parallel port, Ethernet interface, and various other ports; and activity in the SCSI controller 120. When the counter 170 times out, a system management interrupt (SMI) is generated to spin down the hard disk drive. When the counter 172 times out, a SMI is generated to suspend the operation of the graphics card, and thereby the monitor. When both the hard disk drive is in spin down mode and the monitor is in suspend mode, a third counter 174 is enabled. The counter 174 is preloaded with a predetermined value. When the counter 174 times out, a signal SLEEP* is driven low by the miscellaneous logic chip 132. The signal SLEEP* is provided to the processor card connected to the CPU connector 114 to indicate that the processor clock will be slowed down for power conservation.

Referring now to FIG. 2, a processor board P for use with the system board S is shown. In the processor board P, the CPU or microprocessor 200 is preferably the 64-bit Pentium® P54 processor from Intel, which operates at 50 or 60 externally and 75 or 90 MHz internally. A 32-bit Pentium® P24 processor can also be used for operation at 50 MHz externally and 75 MHz internally or 60 MHz externally and 90 MHz internally. The microprocessor 200 can also be a 486 DX4™ processor, also from Intel, which operates at 33 MHz externally and 100 MHz internally. Other processors may be utilized. The microprocessor 200 is connected to a processor bus 202 having data, address and control portions PD, PA and PC. When used with the Pentium® P54 processor, the width of the data bus PD is 64 bits. With the Pentium® P24 processor or the 486 DX4™ processor, the width of the bus PD is 32 bits.

The microprocessor 200 includes an internal or L1 cache memory. A level 2 (L2) or external cache memory system 208 is connected to the processor bus 202 to provide additional caching capabilities to improve performance of the computer system. A processor cache and memory controller (CMC) and PCI bridge chip 210 is connected to the control portion PC and to the address portion PA. The CMC 210 receives the signal SLEEP* provided by the miscellaneous logic chip 132 to place the microprocessor 200 into low power mode. The CMC 210 also controls data buffers 212 and 213. Additionally, the CMC 210 provides control signals MC and address signals MA to a main memory 214. The control signals MC include various RAS* and CAS* signals. The CMC 210 is also connected to the L2 cache memory 208, as it incorporates the cache controller, and therefore, controls the operations of cache memory devices 209 in the L2 cache system 208. The cache memory devices 209 are implemented with static random access memories (SRAMs). For the 32-bit processors, cache memory sizes of 128K or 256K bytes are supported, with the cache line width being 16 bytes. For the 64-bit processors, cache sizes of 256K and 512K bytes are supported, with the cache line width being 32 bytes.

In addition, the CMC 210 supports either asynchronous (standard) or synchronous (burst) SRAMs as the cache data RAMs. When the microprocessor 200 is implemented with the Pentium processors, burst SRAMs must be used to enable operation at 50 MHz or 60 MHz. A burst SRAM includes a 2-bit counter for incrementing burst addresses during a burst cycle. For the preferred 486 DX4 microprocessor, which operates at 33 MHz, asynchronous SRAMs are preferably used for reduced cost. The cache memory system 208 is preferably configurable as either having a 32K or 64K depth. Additionally, the L2 cache memory 208 is further divided into blocks, where each block contains either two lines or four lines. The replacement policy requires that one block be replaced at a time.

The cache memory system 208 is also configurable as either direct mapped, single-bank two-way set associative, or two-bank two-way set associative. The single-bank configuration refers to the use of one bank of cache SRAMs and the two-bank configuration refers to the use of two banks of cache SRAMs. In the two-bank configuration, each bank corresponds to one way of the L2 cache memory 208. Although FIG. 2 shows four SRAM chips, the total number of SRAM chips depends on how the cache memory system 208 is configured. The number and size of the cache SRAMs used in the preferred embodiment is shown in Table 1.

TABLE 1

| CACHE SIZE | BANKS | ASSOC-IATIV-ITY | SRAM TYPE | CPU | CACHE SRAM SIZE | NUMBER OF SRAMS |
|---|---|---|---|---|---|---|
| 128K | 1 | Direct Map | Async | 486 | 32K × 9 | 4 |
| 256K | 1 | Direct Map | Async | 486 | 64K × 9 | 4 |
| 256K | 1 | 2-Way | Async | 486 | 64K × 9 | 4 |
| 256K | 2 | 2-Way | Async | 486 | 32K × 9 | 8 |
| 128K | 1 | Direct Map | Burst | P24 | 32K × 18 | 2 |
| 256K | 1 | Direct Map | Burst | P24 | 64K × 18 | 2 |
| 256K | 1 | 2-Way | Burst | P24 | 64K × 18 | 2 |
| 256K | 2 | 2-Way | Burst | P24 | 32K × 18 | 4 |
| 256K | 1 | Direct Map | Burst | P54 | 32K × 18 | 4 |
| 256K | 1 | 2-Way | Burst | P54 | 32K × 18 | 4 |
| 512K | 1 | Direct Map | Burst | P54 | 64K × 18 | 4 |
| 512K | 1 | 2-Way | Burst | P54 | 64K × 18 | 4 |
| 512K | 2 | 2-Way | Burst | P54 | 32K × 18 | 8 |

The first column of Table 1 designates the total size of the L2 cache memory 208. Column 2 indicates the number of banks of SRAMs used. The third column shows whether the cache memory 208 is configured as direct mapped or two-way set associative, and the fourth column indicates whether asynchronous or burst SRAMs are used. Column 5 of Table 1 shows the type of processor used. Finally, the sixth and seventh columns indicate the preferred SRAM chip sizes and the number of SRAM chips used, respectively.

The L2 cache memory 208 supports both the writethrough and writeback cache consistency protocols. If the writethrough protocol is used, all writes to the L2 cache memory 208 are written back to main memory 214 to maintain coherency between the L2 cache 208 and main memory 214. The writeback cache uses the MESI (Modified/Exclusive/Shared/Invalid) protocol, as is well known in the art. The L2 cache memory 208 write policy is determined by the state of bit 4 in a configuration register. When set, this bit indicates a writeback policy; if cleared, a writethrough policy is implemented. Configuration cycles are provided for on the PCI bus 98 to allow for software driven initialization and configuration of PCI bus devices in a separate address space. For more information on PCI configuration cycles, refer to the PCI Specification 2.0 from the PCI Special Interest Group in care of Intel Corporation, which is hereby incorporated by reference.

To detect if addresses provided by the microprocessor 200 or various PCI bus masters during a memory cycle are located in the L2 cache memory 208, two tag RAMs 230 and 232 are provided in the CMC 210. Preferably, the tag RAMs 230 and 232 are each organized as 2Kx20. Depending on the size and associativity of the L2 cache memory 208, portions of processor address PA are used to index to a line in each tag RAM 230 or 232. For example, for a direct-mapped, 256K configuration having four lines per block and 16 bytes per line, processor address bit PA[17] selects one of the tag RAMs 230 or 232. Address bits PA[16:6] index to an entry in the selected tag RAM, and address bits PA[5:4] select the desired cache line. Each entry in the tag RAMs 230 or 232 contains a label and two state bits for each line in the block. Thus, for the above configuration, the 11 most significant bits comprise the label, which is compared to processor address bits PA[27:17] to determine if a match occurs. If the labels match, the state bits corresponding to the selected line are examined to determine the state of the cache line.

Another possible configuration is a 256K, two-way set associative cache having four lines per block and 32 bytes per line. For this configuration, the tag RAM 230 corresponds to the first way, and the tag RAM 232 corresponds to the second way. The indexing of the selected tag RAM is performed by address bits PA[17:7] and the line selection is done by bits PA[6:5]. The label is contained in processor address bits PA[27:18]. The above sets forth two possible configurations, it being understood that other configurations for the L2 cache memory 208 are available.

The data buffers 212 and 213, which are preferably implemented with ASICs, are connected between the processor data bus PD and the memory data bus MD provided by the memory array 214. The data buffers 212 and 213 are also connected to the PCI address and data bus PCIAD through a connector 224, which is provided to be mateably received by the processor connector 114. The data buffers 212 and 213 are connected to various control signals from the CMC 210.

The data buffers 212 and 213 each include a SLAVE_ input. As shown, the SLAVE_input to the data buffer 212 is tied to ground and the SLAVE_ input of the data buffer 213 is not connected, the input being pulled high by an internal pull-up resistor. The data buffer 212 is referred to as the slave data buffer, and the data buffer 213 is referred to as the master data buffer. Each data buffer receives half the data bits from the processor, memory and PCI data buses PD, MD, and PCIAD, respectively.

Clock distribution and generation circuitry 222 is associated with the processor card P and is connected to the CMC 210. The clock distribution circuitry 222 provides a clock CLK to the processor bus 202. The processor connector 224 is connected to the CMC 210 and the clock distribution circuitry 222 to provide clocks to the computer system and to provide a PCI interface to allow the microprocessor 200 to access the PCI and EISA buses 98 and 99 and to allow PCI and EISA bus masters to access the main memory array 214. The PCI address and data are multiplexed on the bus PCIAD, with the address provided during the address phase and data provided during the data phase.

In the preferred embodiment, the L2 cache memory 208, whether implemented with asynchronous or synchronous cache SRAMs 209, is placed into low power mode whenever a stop grant acknowledge cycle is detected on the processor bus 202 or a HLT command is executed by the microprocessor 200. Upon execution of a HLT instruction, the microprocessor 200 generates a halt special cycle on the processor bus 202. The halt special cycle is indicated by the following bus definition signals: byte enable bit PBE[2]* is asserted low, signals M/IO* and D/C* are asserted low, a signal W/R* is driven high, and the address bits PA[31:0] are driven to the value 0x00000000. The stop grant acknowledge special bus cycle is driven by the microprocessor 200 in response to its STPCLK* input being asserted low, which is a request to slow down or stop the clock input of the microprocessor 200. The signal STPCLK* is asserted by the CMC 210 in response to the assertion of the signal SLEEP* by the miscellaneous logic chip 132. When the signal STPCLK* is asserted, the microprocessor 200 stops execution on the next instruction boundary unless superseded by a higher priority interrupt. Then the microprocessor 200 generates a stop grant acknowledge special bus cycle. The definition of the stop grant acknowledge bus cycle is identical to the halt special cycle except that the address bits PA[31:0] are driven to the value 0x00000010. Thus, a halt special cycle and a stop grant acknowledge special cycle differ only in address bit PA[4]. For a description of the signals discussed above, refer to *IntelDX4 Processor Data Book* (1994) (hereinafter "IntelDX4™ Data Book"); and *Pentium Processor User's Manual, Volume 1: Pentium Processor Data Book* (1994) (hereinafter "Pentium® Data Book"), which are hereby incorporated by reference.

Synchronous or burst SRAMs include the following inputs: address strobe inputs ADSP* and ADSC* and chip select inputs CS*. The synchronous SRAM is placed into low power mode by asserting its address strobe input ADSC* low but maintaining its chip select input CS* deactivated. Burst cycles are initiated in the synchronous SRAMs 209 by asserting either their ADSP* or ADSC* input pins, which cause the initial burst address to be strobed into the SRAMs. The ADSP* inputs of the cache SRAMs 209 are connected to the processor address strobe signal ADS* driven by the microprocessor 200 and the ADSC* inputs are connected to address strobe signals CADS0* or CADS1* provided by the CMC 210. Asynchronous SRAMs do not include address strobe inputs ADSC* or ADSP*. Instead, they have an address latch input CALEN for latching in the external address. Asynchronous SRAMs are placed into low power mode simply by deasserting their chip select inputs CS*.

In the preferred embodiment, the CMC 210 provides two address strobe signals CADS0* and CADS1* and two chip select signals CCS0* and CCS1*. The manner in which these signals are used depends on whether the L2 cache memory 208 is configured as direct mapped, single-bank two-way set associative, or two-bank two-way set associative. In the first case, only address strobe signal CADS0* and chip select signal CCS0* are provided to the cache memory devices 209, while the signals CADS1* and CCS1* are left unconnected. In single-bank two-way set associative mode, the signal CADS0* is provided as the address strobe to the first way, the signal CADS1* is provided as the address strobe to the second way, and the signal CCS0* acts as the chip select signal. The signal CCS1* is used effectively as an address signal to perform the way selection in this configuration. In the two-bank two-way set associative case, address strobe signal CADS0* and chip select signal CCS0* are provided to the first way, and address strobe signal CADS1* and chip select signal CCS1* are provided to the second way. It is noted that signals CADS0* and CADS1* are used as address strobes only with sychronous cache SRAMs 209. If asynchronous cache SRAMs are used, the signals CADS0* and CADS1* correspond to address bits, as will be further described later.

The STPCLK* input of the microprocessor 200 allows system hardware to control the power consumption of the microprocessor 200 by slowing down or stopping the clock input of the microprocessor 200. The microprocessor 200 enters into a stop grant state in response to the assertion of its STPCLK* input. Once the microprocessor 200 enters the stop grant state, its clock input can be changed, either by stopping the clock completely or by slowing down the clock. If the clock input remains active, the microprocessor 200 stays in the stop grant state. In the stop grant state, the microprocessor 200 can wake up relatively quickly, returning to its normal operating state 10–20 clock periods after the signal STPCLK* is deasserted. If the clock input is stopped completely while the microprocessor 200 is in the stop grant state, the microprocessor 200 enters into a stop clock state, where the power consumption is reduced further. In the stop clock state, waking up the microprocessor 200 is much slower, since the internal logic of the microprocessor 200 is completely powered down.

Execution of the HLT instruction causes the microprocessor 200 to enter a state referred to as the auto halt power down state, which is also a low power consumption state. From this state, the microprocessor 200 transitions back to the normal state on the occurrence of a hardware interrupt INTR, a non-maskable interrupt NMI, a system reset RESET, or a soft reset SRESET. In response to the HLT instruction, the microprocessor 200 generates a halt special cycle on the processor bus 202. The CMC 210 forwards the halt special cycle to the PCI bus 98 to notify the rest of the computer system that the microprocessor 200 intends to enter into the auto halt power down state. After the CMC 210 receives an acknowledge on the PCI bus 98, it drives either the RDY* or BRDY* ready signals active on the processor bus 202 to acknowledge to the microprocessor 200 that the halt special cycle has completed normally. In response, the microprocessor 200 enters into the auto halt power down state. For the Pentium®D P54 processor, the signal BRDY* is used to indicate completion of all bus cycles. However, for the 486 DX4™ or Pentium® P24 processors, the signal BRDY* indicates the completion of a burst cycle and the signal RDY* indicates the completion of non-burst cycles.

Figure 3A:
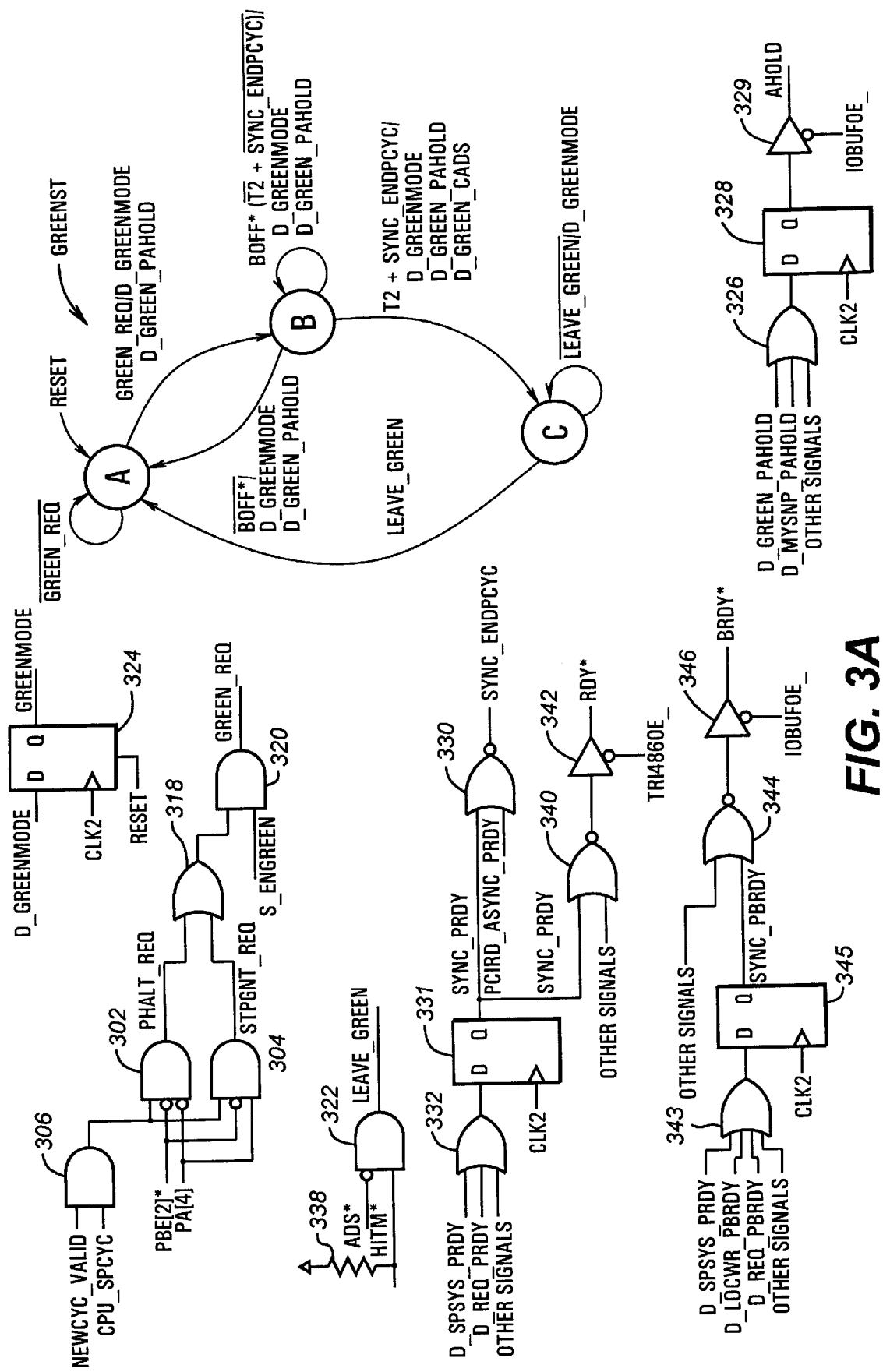
FIGS. 3A and 3B are logic diagrams of circuitry for detecting and responding to special bus cycles.
Figure 3B:
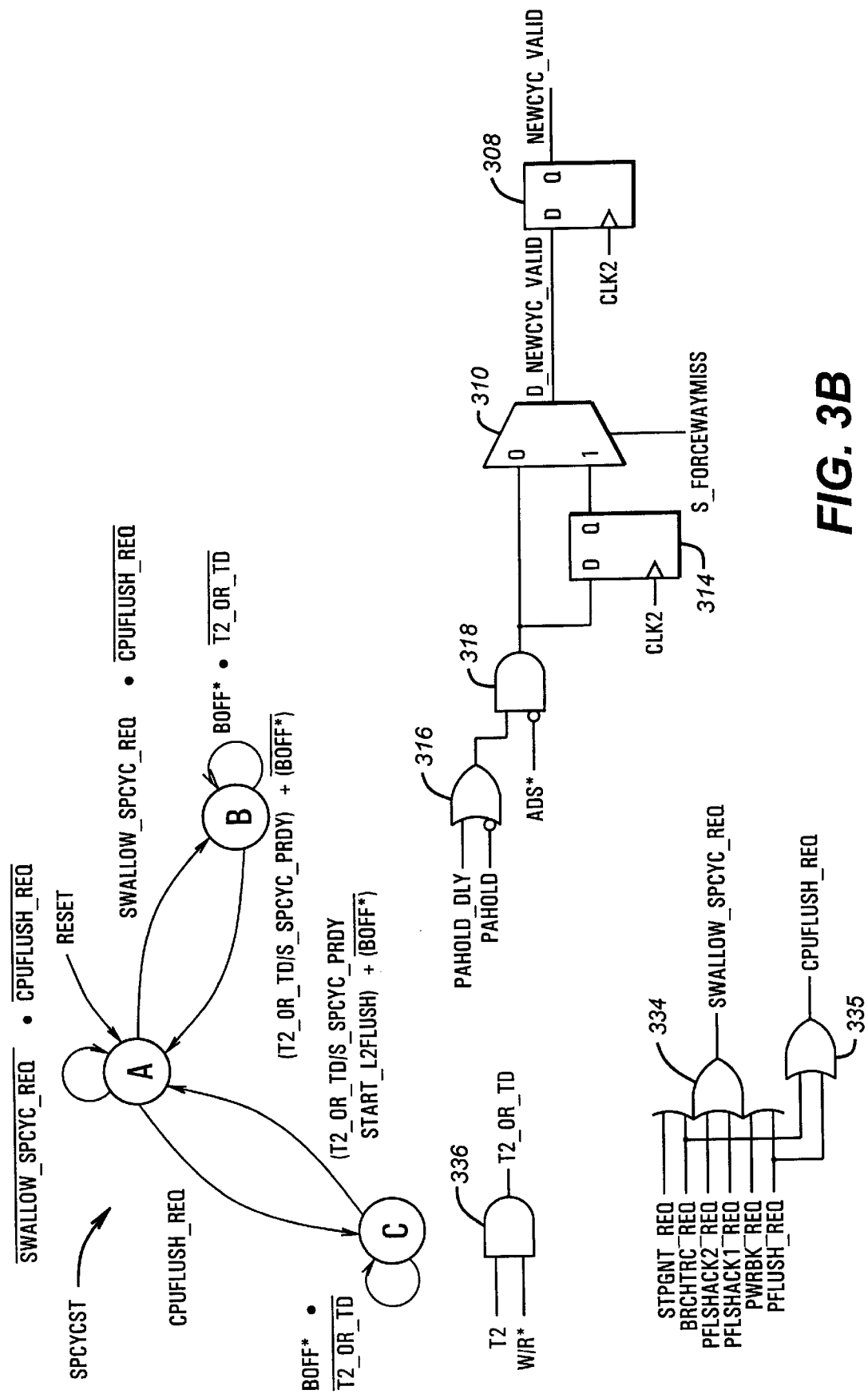

Referring now to FIGS. 3A and 3B, logic for responding to halt and stop grant acknowledge special cycles is shown. An AND gate 302 asserts a signal PHALT_REQ to indicate when a halt special cycle has been decoded on the processor bus 202. An AND gate 304 asserts a signal STPGNT_REQ to indicate a stop grant acknowledge cycle. The inputs of the AND gate 302 receive a signal CPU_SPCYC_REQ, the inverted state of the processor byte enable bit PBE[2]*, and the inverted state of processor address bit PA[4]. The inputs of the AND gate 304 receive the CPU_SPCYC_REQ signal, the inverted state of processor byte enable bit PBE[2]* and the state of the processor address bit PA[4]. The signal CPU_SPCYC_REQ is provided by an AND gate 306, which receives input signals NEWCYC_VALID and CPU_SPCYC. The signal CPU_SPCYC indicates that a special cycle is detected and is asserted high if the processor bus signals M/IO*, D/C*, and W/R* are driven low, low and high, respectively. The signal NEWCYC_VALID is asserted high one CLK2 clock cycle (33 or 50 MHz operation) or two CLK2 cycles (60 MHz operation) after the address strobe ADS* is driven low by the microprocessor 200 to indicate a new valid bus cycle. The clock signal CLK2 is the internal clock of the CMC 210.

The signal NEWCYC_VALID is provided by a D flip flop 308, whose D input receives a signal D_NEWCYC_VALID provided by the output of a multiplexor 310. The 0 and 1 inputs of the multiplexor 310 are connected to the output of an AND gate 312 and the output of a D flip flop 314, respectively. The multiplexor 310 is selected by a signal S_FORCEWAYMISS, which preferably corresponds to bit 4 of a configuration register. The signal S_FORCEWAYMISS is set high to force a wait state for address decoding in the CMC 210 during operation at 60 MHz.

The D flip flop 314 is clocked by the signal CLK2, and its D input is connected to the output of the AND gate 312. The inputs of the AND gate 312 are connected to the inverted state of the address strobe ADS* and the output of an OR gate 316. The inputs of the OR gate 316 receive signals PAHOLD_DLY and the inverted state of a signal PAHOLD. Assertion of the signal PAHOLD causes the CMC 210 to assert an address hold signal AHOLD to the microprocessor 200, which causes the microprocessor 200 to tristate all its address signal outputs. The signal AHOLD is driven high to allow the CMC 210 to drive a snoop address onto the address bus PA during a snoop cycle, which allows the microprocessor 200 and the CMC 210 to determine if the addressed data is stored in the L1 cache or the L2 cache memory 208. For non-snoop cycles, the signal PAHOLD is deasserted low, thereby enabling the AND gate 312 to detect activation of the address strobe ADS*. The signal PAHOLD_DLY is the signal PAHOLD delayed by one CLK2 cycle, and is used to qualify the address strobe ADS* to determine if an L1 writeback cycle initiated by the microprocessor 200 is occurring. An L1 writeback cycle occurs if a hit occurs to a modified line in the L1 cache of the microprocessor 200. Even though the signal AHOLD is maintained asserted by the CMC 210, the microprocessor 200 nevertheless asserts the address strobe ADS* to initiate the L1 writeback cycle. Thus, in an L1 writeback cycle, detection of the address strobe ADS* occurs one CLK2 cycle after AHOLD is asserted high.

The signals PHALT_REQ and STPGNT_REQ are provided to the inputs of an OR gate 318, whose output is connected to one input of an AND gate 320. The other input of the AND gate 320 receives a signal S_ENGREEN, which preferably corresponds to a bit in a configuration register. The signal S_ENGREEN is set high to enable the power conservation features of the CMC 210. The output of the AND gate 320 drives a signal GREEN_REQ to indicate when a halt bus cycle or a stop grant cycle has been detected.

A state machine GREENST responds to assertion of the signal GREEN_REQ by asserting various signals to indicate low power mode. On reset, indicated by a signal RESET being asserted high, the state machine GREENST enters into state A, where it remains until the signal GREEN_REQ is asserted high. The state machine GREENST provides output signals D_GREENMODE, D_GREEN_PAHOLD and D_GREEN_CADS, which are all deasserted low in state A. Unless otherwise indicated, output signals of state machines are assumed to be deasserted. On the assertion of the signal GREEN_REQ, control proceeds from state A to state B. The signals D_GREENMODE and D_GREEN_PAHOLD are asserted high in the transition. The signal D_GREENMODE is provided to the D input of a D flip flop 324, which is clocked by the signal CLK2 and reset low on the rising edge of the signal RESET. The D flip flop 324 provides a signal GREENMODE which, when asserted high, indicates to the rest of CMC 210 that low power mode is currently active. The signal D_GREEN_PAHOLD is provided to an input of an OR gate 326. The OR gate 326 also receives a signal D_MYSNP_PAHOLD asserted during snoop cycles. The other inputs of the OR gate 326 receive other signals asserted during other cycles. The output of the OR gate 326 is connected to the D input of a D flip flop 328, which is clocked by the signal CLK2, and whose output is connected to the input of a tristate buffer 329. The tristate buffer is enabled by the active low signal IOBUFOE_, and it drives the address hold signal AHOLD. The signal IOBUFOE_ is normally asserted low and is deasserted high only during certain test cycles. The signal AHOLD is asserted until the CMC 210 returns the ready acknowledge signal RDY* or BRDY* to the microprocessor 200. The signal AHOLD is asserted here to prevent the microprocessor 200 from possibly starting another cycle while the cache SRAMs 209 are in the process of being powered down.

While in state B, the state machine GREENST maintains the signals D_GREENMODE and D_GREEN_PAHOLD asserted high. If a backoff signal BOFF* is detected active low, the state machine GREENST transitions from state B back to state A while maintaining the signals D_GREENMODE and D_GREEN_PAHOLD asserted high. The BOFF* signal causes the microprocessor 200 to abort all outstanding bus cycles that have not yet completed. If signals T2 and SYNC_ENDPCYC are asserted high, the state machine GREENST transitions from state B to state C, asserting the signal D_GREEN_CADS high and maintaining signals D_GREENMODE and D_GREEN_PAHOLD asserted. The signal T2 is asserted high when the processor bus cycle is in state T2. In Intel terminology, state T1 of a bus cycle is the first clock of a bus cycle where a valid address and status signals are driven and the address strobe ADS* is asserted low. State T2 of a bus cycle is the second and subsequent clocks in the bus cycle, where data is driven by the microprocessor 200 if the cycle is a write or expected by the microprocessor 200 if the cycle is a read. Also, in state T2, signals RDY* and BRDY* are sampled by the microprocessor 200 to detect the end of the bus cycle.

When asserted, the signal SYNC_ENDPCYC indicates that the CMC 210 has responded to the halt special cycle or stop grant acknowledge special cycle or other cycles by asserting signals RDY* or BRDY*. The signal SYNC_ENDPCYC is provided by an OR gate 330, whose inputs receive signals PCIRD_ASYNC_PRDY and SYNC_PRDY. The signal PCIRD_ASYNC_PRDY is asserted to indicate the completion of a read cycle on the PCI bus 98 initiated by the microprocessor 200. The signal SYNC_PRDY is provided by a D flip flop 331, which is clocked by the signal CLK2. The D input of the D flip flop is connected to the output of an OR gate 332. An input of the OR gate 332 receives a signal D_SPCYC_PRDY, which is provided by a state machine SPCYCST. Another input receives a signal D_REQ_PRDY. As explained above, the CMC 210 forwards a halt special cycle to the PCI bus 98. Receipt of an acknowledge signal on the PCI bus 98 causes the signal D_REQ_PRDY to be asserted. The other inputs receive signals asserted during other cycles. On reset, the state machine SPCYCST transitions to state A, where it remains until either a signal CPUFLUSH_REQ is asserted high or a signal SWALLOW_SPCYC_REQ is asserted high and the signal CPUFLUSH_REQ is deasserted low. In state A, output signals D_SPCYC_PRDY and START_L2FLUSH are deasserted low. The signal CPUFLUSH_REQ is provided by an OR gate 335, which receives signals PFLUSH_REQ and PFLSHACK2_REQ. The signal CPUFLUSH_REQ is asserted high when a flush special cycle is decoded on the processor bus 202, which is indicated by the assertion of the signal PFLUSH_REQ. If Pentium processors are used, the signal CPUFLUSH_REQ is also asserted high during the flush acknowledge special cycle indicated by the assertion of the signal PFLSHACK2_REQ. For a description of these cycles, refer to the Intel DX4 Data Book and the Pentium Data Book.

The signal SWALLOW_SPCYC_REQ is provided by an OR gate 334, whose inputs receive the signal STPGNT_REQ; a signal BRCHTRC_REQ which is asserted high during a branch trace special cycle; the signal PFLSHACK2_REQ; a signal PFLSHACK1_REQ, which follows the inverted state of the address bit PA[2] driven by the CMC 210 as part of the writeback address during an L2 writeback cycle if a 32-bit microprocessor 200 is used; a signal PWRBK_REQ that is asserted high during a writeback special cycle which indicates to the rest of the computer system that modified lines in the microprocessor's L1 cache have been written back to the L2 cache 208 or main memory 214; and the signal PFLUSH_REQ which is asserted high during the flush special cycle to indicate that the internal cache in the microprocessor 200 has been invalidated and that the external L2 cache 208 must also be invalidated.

Thus, assertion of the signal STPGNT_REQ in response to a stop grant acknowledge cycle causes the signal SWALLOW_SPCYC_REQ to be asserted, which in turn causes the state machine SPCYCST to transition from state A to state B. The state machine SPCYCST remains in state B until a signal T2_OR_TD is asserted high or the backoff signal BOFF* is asserted low. Assertion of BOFF* causes the state machine SPCYCST to return to state A while maintaining its output signals deasserted. If the signal T2_OR_TD is asserted high, the state machine SPCYCST also returns to state A, but it asserts the signal D_SPCYC_PRDY high for driving the signal SYNC_ENDPCYC high. The signal T2_OR_TD is provided by an AND gate 336, whose inputs receive signals T2 and W/R*. During a special cycle, the signal W/R* is maintained high.

The signal D_SPCYC_PRDY is also provided to one input of an OR gate 343. The OR gate 343 also receives a signal D_LOCWR_PBRDY asserted high during a local write cycle and a signal D_REQ_PBRDY asserted when the halt special cycle forwarded to the PCI bus 98 is acknowledged. The OR gate 343 also receives other signals asserted during other cycles. The output of the OR gate 343 is connected to the D input of a D flip flop 345, which is clocked by the signal CLK2. The output of the D flip flop 345 is connected to one input of a NOR gate 344, which also receives other signals asserted in other cycles. The output of the NOR gate 344 is connected to the input of a tristate buffer 346, which drives the ready signal BRDY* and is enabled by the signal IOBUFOE_. Thus, assertion of the signal D_SPCYC_PRDY causes the signal BRDY* to be driven back to the microprocessor 200.

The signal SYNC_PRDY provided by the D flip flop 331 is also provided to one input of a NOR gate 340. The NOR gate 340 also receives other signals asserted high to activate the signal RDY* during other cycles. The output of the NOR gate 340 is connected to the input of the tristate buffer 342, which drives the ready signal RDY*. The tristate buffer 342 is enabled by a signal TRI486OE_ being asserted low, which occurs only if a 486 DX4 or Pentium P24 processor is used. The ready signals RDY* and BRDY* are provided to the microprocessor 200 to acknowledge the halt and stop grant acknowledge special cycles.

Returning now to the state machine GREENST, the assertion of the signals SYNC_ENDPCYC and T2 causes control to transition from state B to state C, where the state machine remains until a signal LEAVE_GREEN is asserted high. In state C, the output signal D_GREENMODE is maintained high to indicate low power mode. The signal LEAVE_GREEN is provided by an AND gate 322, which receives the inverted state of the address strobe ADS* and a signal HITM* provided by the microprocessor 200 to indicate a hit to a modified line in the L1 cache during a snoop cycle. When the address strobe ADS* is asserted by the microprocessor 200 in conjunction with the assertion of the signal HITM*, a writeback cycle of the modified line to main memory 214 is indicated. Since the microprocessor 200 is able to respond to a snoop cycle while it is in the stop grant state or the auto halt power down state, the writeback of a modified line does not require that the microprocessor 200 be taken out of low power mode. As a result, the state machine GREENST stays in state C and the signal D_GREENMODE is maintained asserted high. The signal LEAVE_GREEN is not driven high until ADS* is detected in a non-writeback cycle. It is also noted that the signal HITM* is provided only by the Pentium processors. When the CMC 210 is used with the 486 DX4 processor, a pullup resistor 338 is provided to pull the signal HITM* high. Assertion of the signal LEAVE_GREEN causes the state machine GREENST to transition from state C back to state A and to deassert the signal D_GREENMODE.

Figure 4:
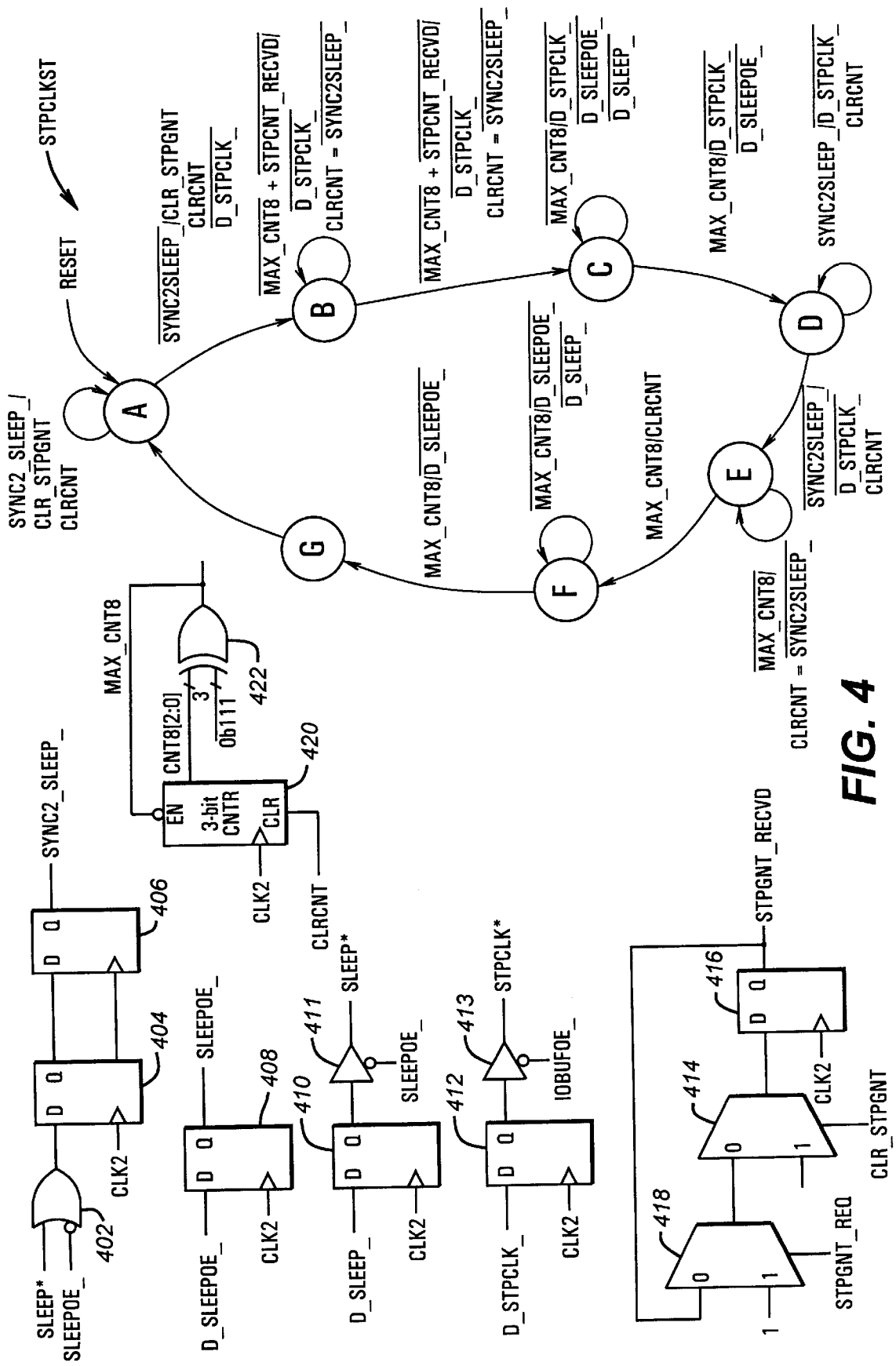
FIG. 4 is a logic diagram of circuitry for asserting a stop clock signal to a microprocessor located on the processor board of FIG. 2.

Referring now to FIG. 4, logic responsive to the signal SLEEP* for driving the stop clock input STPCLK* of the microprocessor 200 is shown. The CMC 210 asserts the STPCLK* input of the microprocessor 200 when the signal SLEEP* is asserted by the miscellaneous logic 132. The signal SLEEP* is received by an OR gate 402 in the CMC 210. The other input of the OR gate 402 receives the inverted state of a signal SLEEPOE_, and its output is connected to the D input of a flip flop 404. The output of the D flip flop 404 is connected to the D input of a D flip flop 406, whose output provides a signal SYNC2_SLEEP_. Both flip flops 404 and 406 are clocked by the signal CLK2.

The signal SLEEPOE_ is provided by a D flip flop 408, whose D input receives a signal D_SLEEPOE_. Once the CMC 210 detects that its SLEEP* input is active, the SLEEP* input pin becomes an output pin, allowing the CMC 210 to perform handshaking with the miscellaneous logic 132 by driving the signal SLEEP* back to the miscellaneous logic 132. The SLEEP* signal is driven by a tristate buffer 411, which is enabled by the assertion of the signal SLEEPOE_. To ensure that the CMC 210 does not sample its own SLEEP* signal, the signal SLEEPOE_ disables the OR gate 402. The input of the tristate buffer 411 is connected to the output of a D flip flop 410, whose D input receives a signal D_SLEEP_. The STPCLK* input of the microprocessor 200 is driven by a tristate buffer 413, which is enabled by the normally active signal IOBUFOE_. The input of the tristate buffer 413 is connected to the output of a D flip flop 412, whose D input receives a signal D_STPCLK_. All three D flip flops 408, 410 and 412 are clocked by the signal CLK2. The signals D_SLEEPOE_, D_SLEEP_ and D_STPCLK_ are provided by a state machine STPCLKST.

The state machine STPCLKST also provides output signals CLR_STPGNT and CLRCNT. In describing the state machine STPCLKST, the signals CLR_STPGNT and CLRCNT are deasserted low and the signals D_SLEEPOE_, D_SLEEP_ and D_STPCLK_ are deasserted high unless otherwise noted. On reset, the state machine STPCLKST enters state A, where the signals CLR_STPGNT and CLRCNT are asserted high and the signals D_STPCLK_, D_SLEEP_ and D_SLEEPOE_ are deasserted high.

The signal CLR_STPGNT is provided to the select input of a multiplexor 414, whose output is connected to the D input of a D flip flop 416. The 0 input of the multiplexor 414 is connected to the output of a multiplexor 418, and the 1 input of the multiplexor 414 is tied low. The multiplexor 418 is selected by the signal STPGNT_REQ, its 1 input is tied high and its 0 input receives a signal STPGNT_RECVD provided by the D flip flop 416. The D flip flop 416 is clocked by the signal CLK2. The signal STPGNT_RECVD is asserted high if a stop grant acknowledge cycle is received and if the signal CLR_STPGNT is deasserted low. Thus, while the state machine STPCLKST remains in state A and the signal CLR_STPGNT is asserted high, the signal STPGNT_RECVD is maintained low.

The signal CLRCNT is provided to the clear input of a 3-bit binary counter 420, which is clocked by the signal CLK2. The counter 420 is cleared to the value 0 when the signal CLRCNT is asserted high. The binary counter 420 is enabled when a signal MAX_CNT8 is negated low. The counter 420 provides output signals CNT8[2:0] to one input of a comparator 422, which compares the value of CNT8[2:0] with the value 0b111. If the comparison is true, then the signal MAX_CNT8 is asserted high to disable the counter 420.

Assertion of the signal SLEEP* by the miscellaneous logic chip 132 causes the signal SYNC2_SLEEP_ to be asserted low two CLK2 cycles later, which then causes the state machine STPCLKST to transition from state A to state B. In the transition, the signals CLR_STPGNT and CLRCNT are maintained high and the signal D_STPCLK_ is asserted low. Assertion of the signal D_STPCLK_ causes the signal STPCLK* to be driven low on the rising edge of the next CLK2. The microprocessor 200 responds by generating a bus grant acknowledge cycle, which causes the signal STPGNT_REQ to be asserted high.

The state machine STPCLKST remains in state B until the signal MAX_CNT8 and the signal STPGNT_RECVD are asserted high. In state B, the signal D_STPCLK_ is maintained asserted low and the signal CLR_STPGNT is deasserted low. The signal CLRCNT is set equal to the inverted state of the signal SYNC2_SLEEP_. Deasserting the signal CLR_STPGNT causes the signal STPGNT_RECVD to be driven high if the signal STPGNT_REQ is asserted. The counter 420 is maintained in the cleared state until the signal SLEEP* is deasserted high by the miscellaneous logic chip 132. Once SLEEP* is deasserted, the clear input of the counter 420 is released two CLK2 cycles later to start the counter 420. The state machine STPCLKST remains in state B until the counter 420 counts to the value 0b111 and a stop grant acknowledge cycle has been asserted by the microprocessor 200. When those conditions occur, the state machine STPCLKST transitions from state B to state C, asserting the signal CLRCNT high and maintaining the signal D_STPCLK_ asserted low. Since the handshaking between the CMC 210 and the miscellaneous logic chip 132 is performed via the same signal, and since the PCI bus 98 may run at a slower clock rate than the processor bus 202, eight CLK2 wait states are inserted to avoid contention between the miscellaneous logic chip 132 and the CMC 210.

In state C, the signal CLRCNT is brought back low to enable the counter 420 to run. In addition, signals D_SLEEP_, D_SLEEPOE_ and D_STPCLK_ are all asserted low. Consequently, the signal SLEEP* is driven low by the CMC 210 to acknowledge to the miscellaneous logic chip 132 that the CMC 210 has responded to the SLEEP* request. The state machine STPCLKST remains in state C until the counter 420 has reached the value 0b111, in which case control transitions to state D. In the transition, the signals D_STPCLK_ and D_SLEEPOE_ are maintained asserted while the signal D_SLEEP_ is deasserted high to drive the signal SLEEP* back high.

The state machine STPCLKST remains in state D until the miscellaneous logic 132 again asserts the signal SLEEP*. In the preferred embodiment, the handshaking protocol between the CMC 210 and the miscellaneous logic chip 132 requires that the miscellaneous logic chip 132 asserts SLEEP* twice, the first time to request the assertion of STPCLK*, and the second time to request the deassertion of the signal STPCLK*. In state D, the signal D_SLEEPOE_ is deasserted high so that the tristate buffer 411 is disabled to avoid contention with the miscellaneous logic chip 132. The signal D_STPCLK_ is maintained low and the signal CLRCNT is asserted high to again clear the counter 420. When the miscellaneous logic 132 asserts the signal SLEEP*, the signal SYNC_SLEEP_ is asserted low two CLK2 cycles later, which then causes the state machine STPCLKST to transition from state D to E. In this transition, the signals D_STPCLK_, D_SLEEPOE_ and CLRCNT are maintained low, high and high, respectively. The state machine STPCLKST waits in state E until the miscellaneous logic chip 132 drives the signal SLEEP* back high. In state E, the signal D_STPCLK_ is deasserted high. As a result, one CLK2 cycle later, the signal STPCLK* is deactivated.

When the miscellaneous logic chip 132 drives SLEEP* high, the signal CLRCNT is asserted low two CLK2 cycles later, enabling the counter 420 to run. When the signal MAX_CNT8 is asserted high 8 CLK2 cycles later, the state machine STPCLKST transitions from state E to F. The signal CLRCNT is asserted high in the transition to clear the counter 420. In state F, the signals D_SLEEPOE_ and D_SLEEP_ are asserted low to drive the signal SLEEP* low as an acknowledge back to the miscellaneous logic chip 132 that the CMC 210 has deasserted the signal STPCLK*. At the same time, the signal CLRCNT is deasserted low to enable the counter 420 to run. When the counter 420 reaches the value 0b111, the state machine STPCLKST transitions from state F to state G, deasserting the signal D_SLEEP_ high and maintaining the signal D_SLEEPOE_ low to drive the signal SLEEP* back high. From state G, the state STPCLKST machine transitions back to state A. The signal D_SLEEPOE_ is deasserted high in the transition to turn off the tristate buffer 411.

Figure 5:
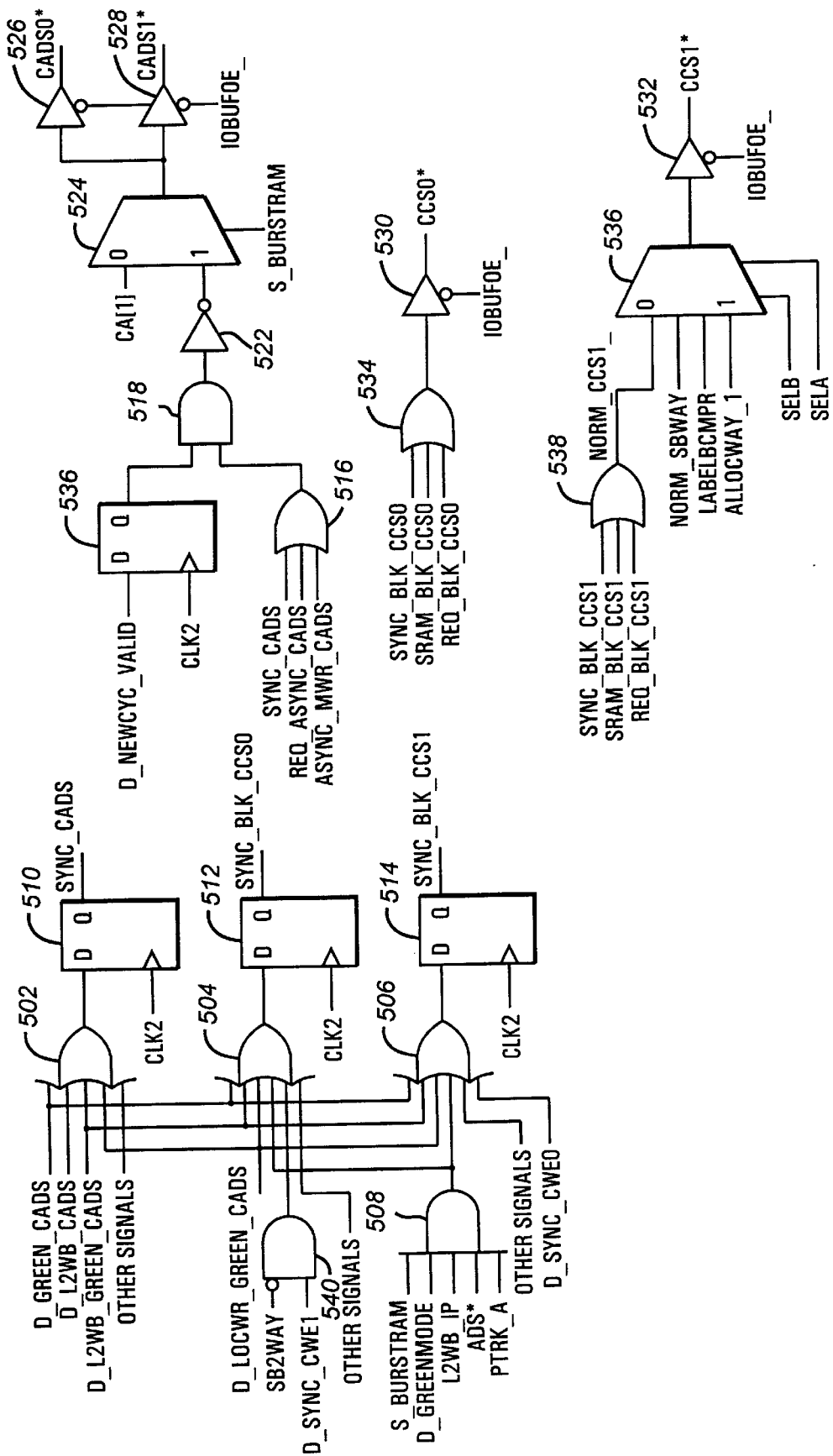
FIG. 5 is a logic diagram of circuitry for generating chip select and address strobe signals for controlling a cache memory system located on the processor board of FIG. 2.

Referring now to FIG. 5, logic for generating address strobes CADS0* and CADS1* and chip select signals CCS0* and CCS1* is shown. The signal D_GREEN_CADS generated by the state machine GREENST is provided to one input of each of OR gates 502, 504 and 506. The OR gates 502, 504 and 506 each also receive signals D_L2WB_GREEN_CADS and D_LOCWR_GREEN_CADS. The OR gates 502, 504 and 506 also receive other signals driven during other cycles to generate the address strobe and chip select signals. In addition, an input of each of the OR gates 504 and 506 is connected to the output of an AND gate 508, whose inputs receive the inverted state of a signal S_BURSTRAM, the signal D_GREENMODE, the inverted state of a signal L2WB_IP, a signal PTRK_A and the address strobe ADS*. The signal S_BURSTRAM corresponds to bit 5 of a configuration register. If the signal S_BURSTRAM is set low, that indicates that the cache SRAMs 209 are asynchronous. If set high, the signal S_BURSTRAM indicates that burst SRAMs are used. The signal L2WB_IP indicates if a state machine WBST (FIG. 7A) for controlling writeback cycles from the L2 cache memory 208 to main memory 214 is active. If high, the signal L2WB_IP indicates that a writeback cycle is in progress; if low, the state machine WBST is idle. The signal PTRK_A is asserted high when the processor bus 202 is inactive, that is, the address strobe ADS* has not been asserted.

Thus, if asynchronous SRAMs 209 are used, and the signal D_GREENMODE is asserted high to indicate low power mode, the AND gate 508 drives its output high if the processor bus 202 is inactive and a writeback cycle is not in progress. As will be described later, this condition causes the chip select CS* inputs of the asynchronous cache SRAMs 209 to be deasserted high to place the SRAMs into low power mode. For an asynchronous SRAM, its chip select input CS* must be maintained high for it to stay in lower power mode. A synchronous SRAM is different, however, since placing it into lower power mode involves asserting its address strobe input ADSC* while maintaining its chip select input CS* deasserted. Thereafter, the chip select CS* input can be driven low again without taking the synchronous SRAM out of low power mode. The synchronous SRAM comes out of low power mode only if one of its address strobe inputs ADSP* or ADSC* is activated.

The output of the OR gates 502, 504 and 506 are connected to D inputs of the D flip flops 510, 512 and 514, respectively. The D flip flops 510, 512 and 514 are clocked by the signal CLK2 and provide signals SYNC_CADS, SYNC_BLK_CCS0 and SYNC_BLK_CCS1, respectively. The signal SYNC_CADS controls the cache address strobe signals CADS0* and CADS1*, and the signals SYNC_BLK_CCS0 and SYNC_BLK_CCS1 control the chip select signals CCS0* and CCS1*, respectively.

The signal SYNC_CADS is provided to one input of an OR gate 516, which also receives signals REQASYNC_CADS and ASYNC_MWR_CADS. The signal REQ_ASYNC_CADS is generated during allocate cycles to the L2 cache memory 208. An allocate cycle is performed to fill or update a line in the L2 cache memory 208 after a read or write miss. The signal ASYNC_MWR_CADS is asserted during memory write cycles and L2 writeback cycles. The output of the OR gate 516 is connected to an input of an AND gate 518, whose other input is connected to the output of a D flip flop 520. The D flip flop 520 is clocked by the signal CLK2 and its D input receives the signal D_NEWCYC_VALID, which indicates the assertion of the address strobe ADS*. The output of the AND gate 518 is connected to the input of an inverter 522, whose output is connected to the 1 input of a multiplexor 524. The 0 input of the multiplexor 524 is connected to a signal CA[1], and the multiplexor 524 is selected by the signal S_BURSTRAM.

The output of the multiplexor 524 is provided to the inputs of tristate buffers 526 and 528, which drive address strobe signals CADS0* and CADS1*, respectively. The tristate buffers 526 and 528 are enabled by the signal IOBUFOE_. Both signals are used as address strobes only if the L2 cache memory 208 is configured as two-way set associative. The signal CADS0* strobes the address into the first way and the signal CADS1* strobes the address into the second way. If the L2 cache memory 208 is organized as direct mapped, then the signal CADS0* is connected to the ADSC* inputs of the cache SRAMs 209 and the signal CADS1* is unconnected.

For burst SRAMs, the burst logic is located in the SRAMs themselves. The CMC 210 provides address advance signals CADV0* and CADV1* to the cache SRAMs 209 to indicate when to increment the address during the burst cycle. However, in the case of asynchronous SRAMs, burst cycles must be controlled entirely by the CMC 210. Since asynchronous cache SRAMs 209 are preferably used only with the 486 DX4 processor, the width of the data bus PD is 32 bits or 4 bytes. Consequently, the two least significant address inputs to the asynchronous cache SRAMs 209 correspond to processor address bits PA[3:2]. The two least significant address inputs of the cache SRAMs 209 are not connected directly to address bits PA[3:2], but are provided by the CMC 210 through its CADSn* and CADVn* outputs, n being equal to 0 or 1. CADSn* corresponds to processor address bit PA[3] and CADVn* corresponds to processor address bit PA[2].

Signals CA[1:0] in the CMC 210 represent processor address bits PA[3:2], respectively. The signal CA[1] is provided to the 0 input of the multiplexor 524, which is selected when the L2 cache memory 208 is implemented with asynchronous SRAMs. The signal CA[0] is similarly multiplexed onto the signals CADVn*. When the address strobe ADS* is asserted by the microprocessor 200 at the beginning of each bus cycle, the signals CA[1:0] are loaded with the state of address bits PA[3:2]. During burst cycles, the signals CA[1:0] are incremented in the CMC 210 for subsequent burst transfers.

Chip select signals CCS0* and CCS1* are provided by tristate buffers 530 and 532, respectively, which are enabled by the signal IOBUFOE__. Chip select signal CCS0* enables the first bank and chip select signal CCS1* enables the second bank of cache SRAMs 209 in two-bank two-way set associative mode. In single-bank two-way set associative mode, the signal CCS0* acts as the chip select signal and the signal CCS1* performs the way selection. In direct-mapped mode, only the signal CCS0* is connected to the cache SRAMs 209. The input of the tristate buffer 530 is connected to the output of an OR gate 534, which receives signals SYNC_BLK_CCS0, SRAM_BLK_CCS0 and REQ_BLK_CCS0. To avoid inadvertent writes, the signal SRAM_BLK_CCS0 is provided to disable the way not written in two-way set associative mode until the write enable inputs of the cache SRAMs 209 not written to have been deasserted high. The signal REQ_BLK_CCS0 is driven during allocate cycles to the L2 cache memory 208. Thus, assertion of the signal D_GREEN_CADS by the state machine GREENST causes the signal SYNC_BLK_CCS0 to be asserted, which causes the signal CCS0* to be deasserted high.

The input of the tristate buffer 532 is connected to the output of a 4:1 multiplexor 536, which is selected by signals SELB and SELA. The 0–3 inputs of the multiplexor 536 receive signals NORM_CCS1_, NORM_SBWAY, LABELBCMPR and ALLOCWAY_1, respectively. The signals SELB and SELA are generated according to Table 2.

TABLE 2

| SELB | SELA | |
|---|---|---|
| 0 | 0 | !SB2WAY |
| 0 | 1 | SB2WAY && !S_BURSTRAM + SB2WAY && S_BURSTRAM && !NEW_PADS60_DLY && !NEWCYC_VALID |
| 1 | 0 | SB2WAY && S_BURSTRAM && NEW_PADS60_DLY && !NEWCYC_VALID |
| 1 | 1 | SB2WAY && S_BURSTRAM && NEWCYC_VALID |

The signals SELB and SELA are both driven low if a signal SB2WAY is negated. The signal SB2WAY is asserted high if the L2 cache memory 208 is configured as single-bank two-way set associative. Thus, if the L2 cache memory 208 is configured as two-bank two-way set associative, the single NORM_CCS1_ is selected by the multiplexor 536. The signal NORM_CCS1_ is provided by an OR gate 538, which receives input signals REQ_BLK_CCS1, SRAM_BLK_CCS1 and SYNC_BLK_CCS1. The signal REQ_BLK_CCS1 is driven during L2 allocate cycles and the signal SRAM_BLK_CCS1 is driven to satisfy hold time requirements with respect to the write enable inputs of the second bank of cache SRAMs 209. The signal SYNC_BLK_CCS1 is asserted high by the D flip flop 514 in response to the assertion of the signal D_GREEN_CADS.

If the signal SB2WAY is asserted high, then one of the other three inputs to the multiplexor 536 is selected. As noted, in single-bank two-way set associative mode, the signal CCS1* is effectively an address signal for selecting one of the two ways. The signal NORM_SBWAY is selected if the signal SB2WAY is asserted high and if the L2 cache memory 208 is implemented with asynchronous SRAMs, as indicated by the signal S_BURSTRAM being set low. The signal NORM_SBWAY is also selected if the signal S_BURSTRAM is set high and signals NEW_PADS60_DLY and NEWCYC_VALID are negated low. This condition indicates that synchronous SRAMs are used and the address strobe ADS* has not been detected active by the CMC 210. The signal NORM_SBWAY is used to perform the way prediction before the address strobe ADS* is asserted. For a more detailed description of way prediction, refer to Patent Application entitled "Cache Way Prediction," filed concurrently herewith, which is hereby incorporated by reference.

The 2 input of the multiplexor 536 is selected if the signals SB2WAY, S_BURSTRAM and NEW_PADS60_DLY are asserted high and the signal NEWCYC_VALID is negated low. This condition indicates that the address strobe ADS* has been detected, but that a wait state is forced for 60-MHz operation. The signal selected in this case is LABELBCMPR, which is asserted high if the label stored in the selected entry of the tag RAM 232 matches the label portion of the address bus PA. Thus, during the wait state forced during operation at 60 MHz, the signal LABELBCMPR performs the way selection.

Finally, the signal ALLOCWAY_1 is selected if the signals SB2WAY, S_BURSTRAM and NEWCYC_VALID are asserted high. Thus, after the signal NEWCYC_VALID is asserted to indicate detection of the address strobe ADS*, the signal ALLOCWAY_1 performs the way selection. For a description of the signal ALLOCWAY_1, refer to the "Cache Way Prediction" Patent Application.

In summary, if the L2 cache memory 208 is implemented with synchronous SRAMs, and the signal D_GREEN_CADS is asserted high by the state machine GREENST in response to a halt special bus cycle or a stop grant acknowledge bus cycle, address strobe signals CADS0* and CADS1* are asserted low by the CMC 210. The signal D_GREEN_CADS also controls chip select signals CCS0* and CCS1*. If the L2 cache memory 208 is configured as direct-mapped or two-bank two-way set associative, then both signals CCS0* and CCS1* are deasserted high; however, in the case of the direct-mapped configuration, the signal CCS1* is ignored. If the L2 cache memory 208 is configured as single-bank two-way set associative, then the signal CCS1* is utilized effectively as an address signal to select between way 0 and way 1, and thus does not play a role in placing the cache SRAMs 209 into low power state. In single-bank two-way set associative mode, assertion of the address strobes CADS0* and CADS1* and deassertion of the chip select signal CCS0* places the cache SRAMs 209 into low power mode. This is accomplished by driving the signal D_GREEN_CADS high for one CLK2 cycle. Once in low power mode, the synchronous cache SRAMs 209 remain there until the processor address strobe ADS* or the cache address strobes CADSn* are asserted low.

For asynchronous cache SRAMs 209, as discussed above, the AND gate 508 forces the chip select signals CCSn* to be deasserted high while the signal D_GREENMODE is active to maintain the cache SRAMs 209 in low power mode.

In the preferred embodiment, two conditions exist that may cause the cache SRAMs 209 to temporarily transition out of low power state. The first involves a snoop hit to a modified line in the internal or L1 cache of the microprocessor 200. This can only occur with the Pentium P54 or P24 processors, as they support the MESI writeback protocol. The 486 DX4 microprocessor, on the other hand, supports only the writethrough protocol. In response to the snoop hit to the modified line, the Pentium microprocessor 200 asserts its HITM* output. Assertion of the signal HITM* informs the CMC 210 that a snoop or inquire cycle has hit a modified line in the internal cache of the microprocessor 200, and that the microprocessor 200 will write back the modified line to the main memory 214. For more information on inquire cycles, refer to the Pentium Data Book.

If the snoop cycle occurred as a result of a memory read cycle initiated by a PCI bus master, then the L2 cache memory 208 is updated if the address provided during the writeback cycle matches an entry in the L2 cache memory 208. Updating the L2 cache memory 208 requires taking the cache SRAMs out of low power mode. The Pentium processor indicates a burst writeback cycle by asserting a cacheability signal CACHE* in a write cycle. It is noted that writeback cycles are burst cycles because the line width of the L1 cache is 32 bytes while the data bus PD width is 8 bytes if a 64-bit processor is used. For a 32-bit processor, the L1 cache line width is 16 bytes and the data bus PD width is 4 bytes. For burst transfers, four data transfers are expected by the Pentium processor, wherein completion of each data transfer is indicated by the assertion of the signal BRDY* by the CMC 210. Thus, the signal HITM* is maintained asserted low by the microprocessor 200 until the fourth BRDY* is returned by the CMC 210.

The second condition that would cause the cache SRAMs 209 to come out of low power state temporarily is if a snoop hit occurs to a modified line in the L2 memory cache system 208. In this instance, the modified line from the L2 cache memory 208 must be written back to main memory 214. To perform the burst writeback cycle, a read of the cache SRAMs 209 is performed to retrieve the modified line.

Figure 6A:
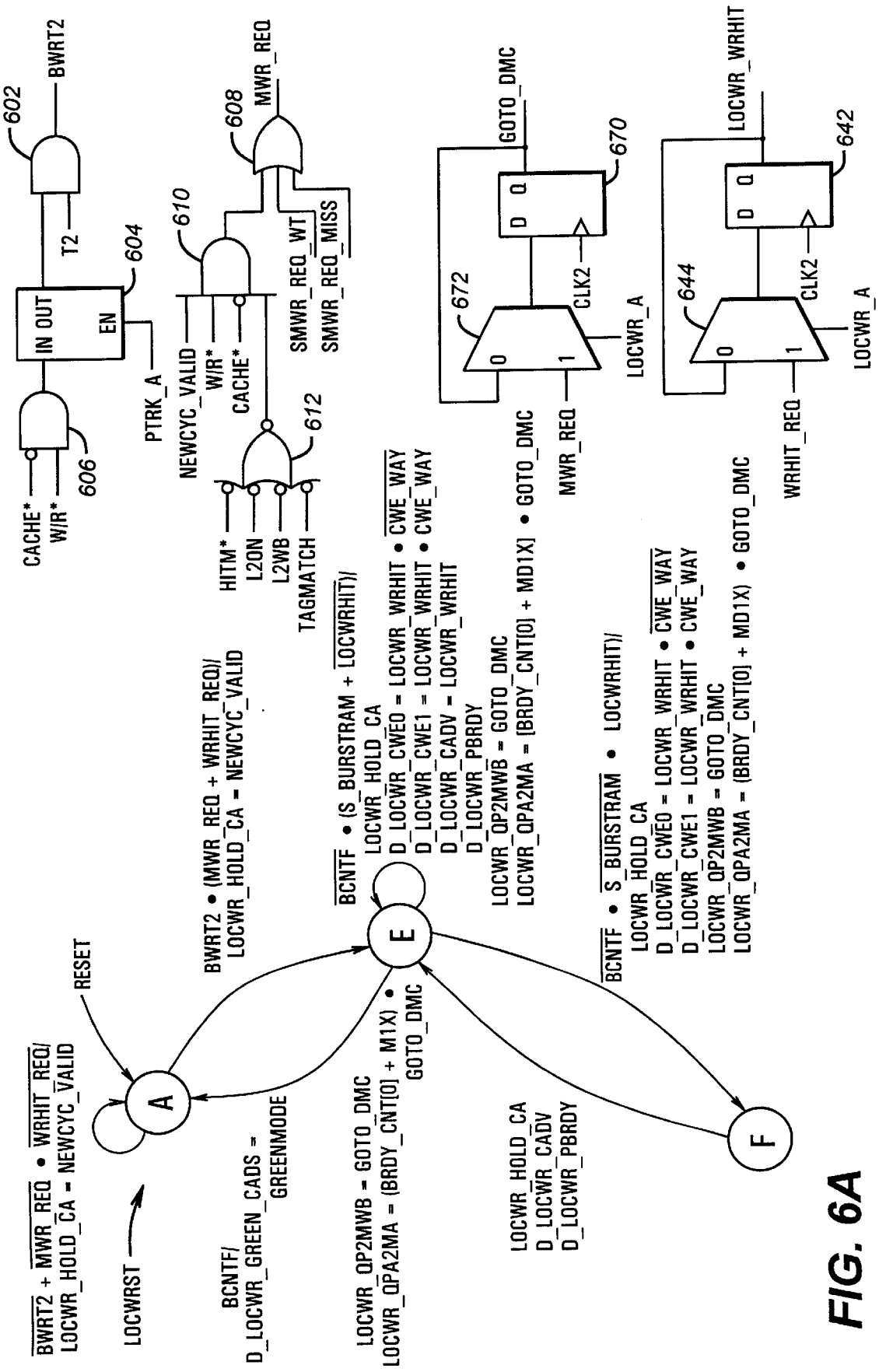
FIGS. 6A and 6B are logic diagrams of circuitry for responding to a writeback cycle initiated by the microprocessor of FIG. 4.
Figure 6B:
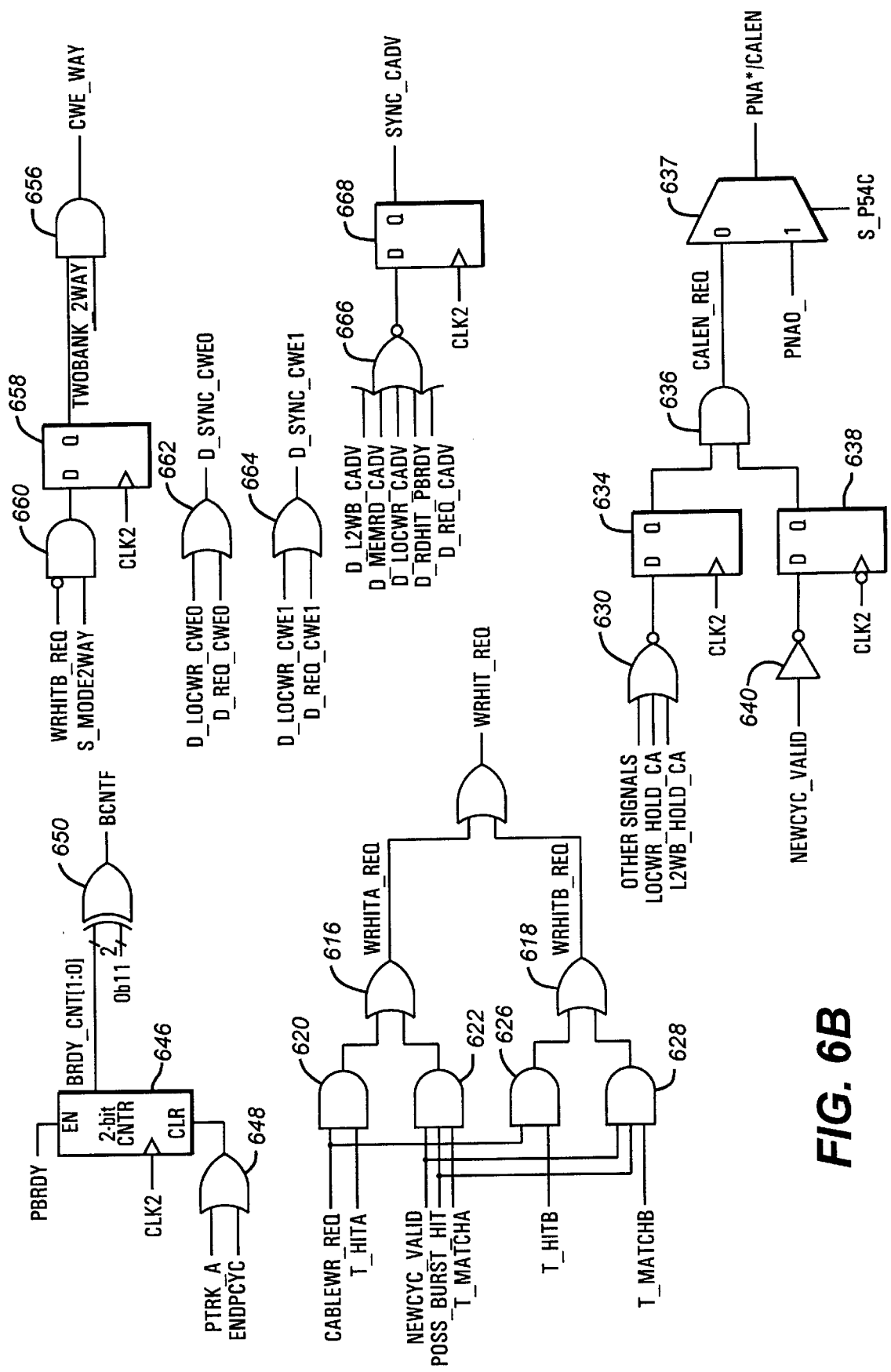

Referring now to FIGS. 6A and 6B, logic is shown that handles the burst writeback cycle executed by the microprocessor 200 in response to a snoop hit to a modified line in the L1 cache. Portions of a state machine LOCWRST for detecting the burst writeback cycle are described. On system reset, the state machine LOCWRST enters state A, where it remains until a signal BWRT2 is asserted high and a signal MWR_REQ or a signal WRHIT_REQ is asserted high. The signal BWRT2 is provided by an AND gate 602 and indicates that a burst write transfer on the processor bus 202 is occurring. The first input of the AND gate 602 is connected to the output of a latch 604, and second input of the AND gate 602 receives the signal T2. The input of the latch 604 is connected to the output of an AND gate 606. The output state of the AND gate 606 is latched by the latch 604 when the signal PTRK_A falls low, which occurs when an active cycle is detected on the processor bus 202. The inputs of the AND gate 606 receive the signal W/R* and the inverted state of the signal CACHE*. When driven high, the signal W/R* indicates a write cycle. If the signal CACHE* is also asserted low, then a burst writeback cycle is indicated.

The signal MWR_REQ, provided by an OR gate 608, indicates when a write cycle is to be provided back to the main memory 214 by the CMC 210. The first input of the OR gate 608 is connected to the output of an AND gate 610, and the other two inputs receive signals SMWR_REQ_WT and SMWR_REQ_MISS. The signal SMWR_REQ_WT is asserted high during a non-burst vote cycle on the processor bus 202 if output pins PWT or PCD from the Pentium processor is asserted high. The signal PWT is asserted high to force the writethrough policy for addresses associated with a specific page, and the signal PCD is asserted high to disable caching in the L2 cache memory 208 on a page by page basis. The signal SMWR_REQ_MISS is asserted high if a miss occurs in the L2 cache memory 208 during a non-burst write cycle and the write cannot be allocated.

The inputs of the AND gate 610 receive the signals W/R* and NEWCYC_VALID and the inverted state of the signal CACHE*. Another input of the AND gate 610 is connected to the output of a NAND gate 612, which receives signals HITM*, L2ON, L2WB and TAGMATCH. The signal L2ON indicates that the L2 cache memory 208 is enabled and the signal L2WB indicates that the L2 cache memory 208 is configured as a writeback cache. The signal TAGMATCH is driven high when a match occurs between the label portion of the processor address PA and the label in the selected entry of the TAG RAM 230 or 232. Thus, the AND gate 610 causes the signal MWR_REQ to be asserted during a writeback cycle from the L1 cache, or if the write cycle is generated by the microprocessor 200 and a miss occurs in the L2 cache memory 208 or the L2 cache memory 208 is either not enabled or is configured in writethrough mode.

The signal WRHIT_REQ is provided by an OR gate 614 and is asserted high when a hit occurs in either TAG RAM 230 or 232 during a burst writeback cycle from the L1 cache. The inputs of the OR gate 614 receive a signal WRHITA_REQ corresponding to tag RAM 230 and a signal WRHITB_REQ corresponding to tag RAM 232. The signals WRHITA_REQ and WRHITB_REQ are provided by OR gates 616 and 618, respectively. The inputs of the OR gate 616 are connected to the outputs of AND gates 620 and 622. The inputs of the AND gate 620 receive signals CABLEWR_REQ and T_HITA. The signal CABLEWR_REQ is asserted high during a non-burst write cycle, and the signal T_HITA is asserted high if the label portion of the address bus PA matches the label in the selected entry of the tag RAM 230, and if the selected line is valid as determined from the corresponding state bits.

The AND gate 622 receives signals NEWCYC_VALID, POSSIBLE_BURST_HIT and T_MATCHA. The signal POSSIBLE_BURST_HIT is asserted high if the CMC 210 detects a burst writeback cycle, the L2 cache 208 is enabled, and the snoop request to the L1 cache in the microprocessor 200 is in response to a memory read operation initiated by a PCI bus master. The signal T_MATCHA is asserted if a match occurs between the label portion of the address bus PA and the label stored in the selected entry of the tag RAM 230, regardless of whether the entry is valid or not. Thus, if the CMC 210 detects a burst writeback cycle on the processor bus 202, the writeback address matches an entry in the tag RAM 230, the tag RAM 230 is selected, and the snoop request is a result of a memory read cycle by a PCI bus master, the AND gate 622 drives its output high, which causes the OR gate 614 to drive the signal WRHIT_REQ high.

The inputs of the OR gate 618 are connected to the outputs of AND gates 626 and 628. The AND gates 626 receive signals CABLEWR_REQ and T_HITB. The AND gate 628 receives signals NEWCYC_VALID, POSSIBLE_BURST_HIT and T_MATCHB. The signals T_HITB and T_MATCHB are identical to signals T_HITA and T_MATCHA, except the former set of signals correspond to the tag RAM 232 whereas the latter set corresponds to the tag RAM 230.

Returning now to the state machine LOCWRST, the writeback cycle executed by the microprocessor 200 causes at least signals BWRT2 and MWR_REQ to be asserted high, which causes the state machine LOCURST to transition from state A to state E. In the transition, a signal LOCWR_HOLD_CA is set equal to the state of the signal NEWCYC_VALID. The signal LOCWR_HOLD_CA is provided to one input of a NOR gate 630. Another input of the NOR gate 630 receives a signal L2WB_HOLD_CA. The signal L2WB_HOLD_CA is described later, it being asserted high during a writeback cycle from the L2 cache memory 208. The NOR gate 630 receives other signals driven during other cycles. The output of the NOR gate 630 is connected to the D input of a D flip-flop 634, which is clocked by the signal CLK2. The output of the D flip-flop 634 is connected to one input of an AND gate 636. The output of the AND gate 636 is connected to the 0 input of a multiplexor 637, whose 1 input receives a signal PNAO_. The multiplexor 637 is selected by a signal S_P54C, which is asserted high if the microprocessor 200 is a Pentium P54 processor. The multiplexor 637 drives the processor next address signal PNA* for a Pentium P54 processor and a signal CALEN when the L2 cache memory 208 is implemented with asynchronous cache SRAMs 209. The signal CALEN is connected to the address latch enable inputs of asynchronous cache SRAMs 209. The state of the processor address bus PA is latched into the asynchronous cache SRAMs 209 when the signal CALEN is driven low.

The other input of the AND gate 636 is connected to the output of a D flip-flop 638. The D flip-flop 638 is clocked on the falling edge of the signal CLK2, and its D input is connected to the output of an inverter 640. The input of the inverter 640 receives the signal NEWCYC_VALID. The D flip-flop 638 is provided to ensure proper hold time of the signal CALEN. Thus, if the L2 cache memory 208 is implemented with asynchronous SRAMs, asserting the signal LOCWR_HOLD_CA causes the signal CALEN to be driven low to latch the processor address bus PA into the cache SRAMs 209. However, if synchronous SRAMs are used, assertion of the address strobe ADS* by the microprocessor 200 loads the initial burst address into the burst SRAMs 209. In addition, asserting the signal ADS* to start the L1 writeback cycle causes the synchronous cache SRAMs 209 to come out of low power state. For asynchronous cache SRAMs 209, assertion of the signal ADS* causes the output of the AND gate 508 to be deasserted low, thereby allowing the chip select signals CCS0* and CCS1* to be asserted low.

The state machine LOCWRST remains in state E if synchronous SRAMs are used and transitions from state E to state F if asynchronous SRAMs are used. State F provides an extra wait state for the asynchronous SRAMs to guarantee data hold time to the SRAMs. In state E, assertion of a signal BCNTF causes the state machine LOCWRST to transition back to state A. The signal BCNTF indicates that four burst transfers have occurred. However, if the signal BCNTF is deasserted low, and the signal S_BURSTRAM is high or a signal LOCWR_WRHIT is deasserted low, the state machine LOCWRST remains in state E. The signal LOCWR_WRHIT is a latched version of the signal WRHIT_REQ, and is provided by a D flip-flop 642. The D flip-flop 642 is clocked by the signal CLK2 and its D input is connected to the output of a multiplexor 644. The multiplexor 644 is selected by a signal LOCWR_A, its 0 input receives the signal LOCWR_WRHIT, and its 1 input receives the signal WRHIT_REQ. The signal LOCWR_A is asserted high if the state machine LOCWRST is in state A. Thus, a match to the selected entry in either tag RAM 230 or 232 during the L1 writeback cycle causes the signal LOCWR_WRHIT to be latched high until the state machine LOCWRST returns to state A.

The signal BCNTF is asserted high when a 2-bit binary counter 646 counts to the value 0b11. The counter 646 keeps track of how many BRDY* signals have been provided back to the microprocessor 200 by the CMC 210. The counter 646 is clocked by the signal CLK2 and it is enabled by a signal PBRDY, which indicates when asserted high that the signal BRDY* is asserted low by the CMC 210. The clear input of the counter 646 is connected to the output of an OR gate 648, which receives signals PTRK_A and ENDPCYC. The signal PTRK_A indicates that the processor bus 202 is currently idle. The signal ENDPCYC is asserted high to indicate the end of a processor bus cycle. Either of these two signals being asserted high causes the counter 646 to reset to zero. The two-bit counter 646 provides signals BRDY_CNT[1:0] to one input of a comparator 650. The comparator 650 drives the signal BCNTF high if the counter 646 has reached the value 0b11.

While in state E, the state machine LOCWRST maintains the signal LOCWR_HOLD_CA asserted high and asserts a signal D_LOCWR_PBRDY high. The signal D_LOCWR_PBRDY is provided to an input of the OR gate 343 (FIG. 3A) for asserting the ready signal BRDY*. Thus, in the preferred embodiment, the signal BRDY* is maintained low for four CLK2 cycles while the state machine LOCWRST is in state E. Assertion of the signal BRDY* in the fourth cycle notifies the Pentium microprocessor 200 that the burst writeback transfer has been completed.

In addition, while the state machine LOCWRST is in state E, a signal D_LOCWR_CWE0, used to control the state of the chip select signal CCS0*, is asserted high if the signal LOCWR_WRHIT is asserted and a signal CWE_WAY is negated low. The signal CWE_WAY, which is meaningful only when the L2 cache memory 208 is configured as two-bank two-way set associative, is provided by an AND gate 656. One input of the AND gate 656 is connected to the output of a D flip-flop 658 and the other input receives a signal TWOBANK_2WAY, which is asserted high if bits 3 and 2 of a configuration register are set high and low, respectively, to indicate a two-bank two-way L2 cache memory 208. The D flip-flop 658 is clocked by the signal CLK2, and its D input is connected to the output of an AND gate 660. The AND gate 660 receives a signal S_MODE2WAY and the inverted state of the signal WRHITB_REQ. In a two-way set associative cache, assertion of the signal WRHITB_REQ indicates a match to the second way. The signal S_MODE2WAY is asserted high if the L2 cache memory 208 is configured as two-way set associative, which is indicated by either bits 3 or 2 of the configuration register located at offset 0x52 being set high. Thus if the L2 cache memory 208 is configured as two-bank two-way set associative, the signal D_LOCWR_CWE0 is asserted high if a hit occurs to the first way, and the signal D_LOCWR_CWE1 is asserted high if the hit occurs to the second way. In a non-two-bank configuration, the signal D_LOCWR_CWE0 is asserted high and the signal D_LOCWR_CWE1 is deasserted low.

The signal D_LOCWR_CWE0 is provided to one input of an OR gate 662 and the signal D_LOCWR_CWE1 is provided to one input of an OR gate 664. The second inputs of the OR gates 662 and 664 receive signals D_REQ_CWE0 and D_REQ_CWE1, respectively, which are driven during non-writeback cycles. The outputs of the OR gates 662 and 664 provide signals D_SYNC_CWE0 and D_SYNC_CWE1, respectively.

Referring back to FIG. 5, the signal D_SYNC_CWE0 is provided to one input of the OR gate 506, which controls the state of the signal SYNC_BLK_CCS1. Thus, in a two-bank configuration, if a match to the first way occurs during the burst writeback cycle, the chip select signal CCS1* is deasserted high. In a non-two-bank configuration, the signal D_SYNC_CWE0 is asserted high to assert the signal SYNC_BLK_CCS1 high. The signal D_SYNQ_CWE1 is provided to one input of an AND gate 540. The other input of the AND gate 540 is connected to the inverted state of the signal SB2WAY, and its output is connected to one input of the OR gate 504, which controls the state of the signal SYNC_BLK_CCS0. Thus, in single-bank two-way set associative mode, the output of the AND gate 540 is maintained low. However, if the L2 cache memory 208 is configured as two-bank two-way set associative, then the state of the signal D_SYNC_CWE1 determines the state of the chip select signal CCS0*. If the second way is selected, indicated by the signal D_SYNC_CWE1 being asserted high, the signal CCS0* is disabled.

Referring back to FIGS. 6A and 6B, the state machine LOCWRST also asserts a signal D_LOCWR_CADV in state E if the signal LOCWR_WRHIT is asserted high. The signal D_LOCWR_CADV is provided to one input of an OR gate 666, whose other inputs receive signals D_L2WB_CADV, D_MEMRD_CADV, D_RDHIT_PBRDY, and D_REQ_CADV, which are driven during a writeback cycle from the L2 cache memory 208, during a processor-to-memory read cycle, at the end of a cycle responding to a read hit of a line in the L2 cache memory 208, and during execution of a queued cycle, respectively. The output of the OR gate 666 is connected to the D input of a D flip-flop 668, which is clocked by the signal CLK2. The output of the D flip-flop 668 provides a signal SYNC_CADV, which controls the state of the burst address advance signals CADVn*, n equal to 0 and 1, provided to burst cache SRAMs 209. When asserted low, the signals CADVn* cause the burst logic in the cache SRAMs 209 to increment the burst address. The signals CADVn* are driven low if the signal SYNC_CADV is asserted high and if synchronous cache SRAMs 209 are used.

While the state machine LOCWRST is cycling in state E, a signal LOCWR_QP2MWB is also asserted high if a signal GOTO_DMC is asserted high. The signal GOTO_DMC is provided by a D flip-flop 670, which is clocked by the signal CLK2. The D input of the D flip flop 670 is connected to the output of a multiplexor 672, whose 0 input is connected to the signal GOTO_DMC, and whose 1 input receives the signal MWR_REQ. The multiplexor 672 is selected by the signal LOCWR_A, which is asserted high when the state machine LOCWRST is in state A. Thus, the signal GOTO_DMC is a latched version of the signal MWR_REQ, which indicates a write cycle to the main memory 214. The signal LOCWR_QP2MWB is provided to the memory controller portion of the CMC 210 to indicate that a writeback operation is being performed to the memory 214. In response to the signal LOCWR_QP2MWB, the memory controller portion of the CMC 210 provides appropriate control signals to the data buffers 212 and 213 to queue the writeback data. For a detailed description of the memory controller portion of the CMC 210, refer to Patent Application entitled "Memory Controller With Write Posting Queues for Processor and I/O Bus Operations and Ordering Logic for Controlling the Queues," filed concurrently herewith, and which is hereby incorporated by reference.

In addition, if the signal GOTO_DMC and the signal BRDY_CNT[0] or MD1X are asserted high, then a signal LOCWR_QPA2MA is asserted high. The signal MD1X indicates that a Pentium P54 processor is used. The signal LOCWR_QPA2MA is a request to the memory controller to queue the CPU-to-memory write address.

The above has described how the synchronous cache SRAMs 209 are activated to handle a L1 burst writeback cycle executed by the microprocessor 200. However, if the L2 cache memory 208 is implemented with asynchronous SRAMs (indicated by the signal S_BURSTRAM being set low), the signal LOCWR_WRHIT is asserted high, and the signal BCNTF is deasserted low, then the state machine LOCWRST transitions from state E to state F. In the transition, the state machine LOCWRST maintains the signal LOCWR_HOLD_CA asserted to keep the writeback address PA[27:4] latched in the asynchronous cache SRAMs 209. In the transition from state E to state F, the signals D_LOCWR_CWE0, D_LOCWR_CWE1, LOCWR_QP2MWB, and LOCWR_QPA2MA are asserted high in response to the same conditions as in state E. From state F, the state machine LOCWRST returns to state E on the next CLK2 cycle. In the transition from state F to state E, the signal LOCWR_HOLD_CA is maintained high, the signal D_LOCWR_CADV is asserted high, and the signal D_LOCWR_PBRDY is asserted high to provide the burst acknowledge signal BRDY* back to the 486 DX4 microprocessor 200. The signal D_LOCWR_CADV drives the signal SYNC_CADV high, which causes the address bits CA[1:0] in the CMC 210 to be incremented and provided to the asynchronous cache SRAMs 209 via output pins CADSn* and CADVn*, respectively.

After assertion of four BRDY* signals, the signal BCNTF is asserted high, causing the state machine LOCWRST to transition from state E to state A. In the transition, the state machine LOCWRST deasserts the signal LOCWR_HOLD_CA to allow a new address to flow into asynchronous cache SRAMs 209 from the processor address bus PA. In addition, if the signal GREENMODE is asserted high to indicate that the microprocessor 200 is in either the stop grant or auto halt power down states, the state machine LOCWRST asserts the signal D_LOCWR_GREEN_CADS high. The signal D_LOCWR_GREEN_CADS is provided to OR gates 502, 504 and 506 (FIG. 5) to assert signals SYNC_CADS, SYNC_BLK_CCS0 and SYNC_BLK_CCS1, respectively. Thus, assertion of the signal D_LOCWR_GREEN_CADS places the cache SRAMs 209 back into low power mode.

Also, in the transition from state E back to state A, assertion of the signal GOTO_DMC causes the signal LOCWR_QP2MB to be asserted high. If the signal GOTO_DMC and either of the signals BRDY_CNT[0] or MD1X are asserted high, then the signal LOCWR_QPA2MA is asserted high.

Figure 7A:
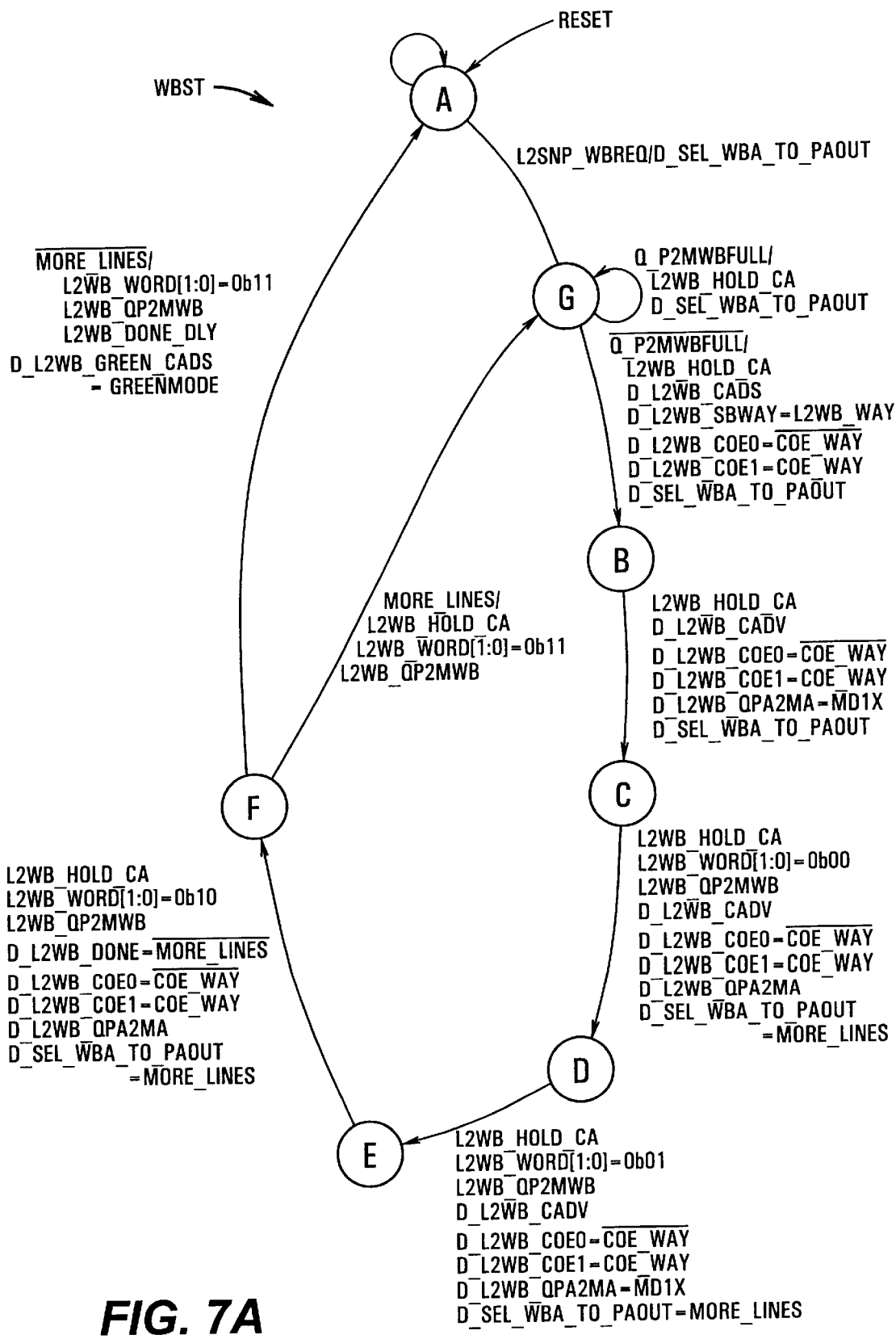
FIGS. 7A and 7B are a logic diagram of circuitry for performing a writeback cycle from the cache memory system of FIG. 5.
Figure 7B:
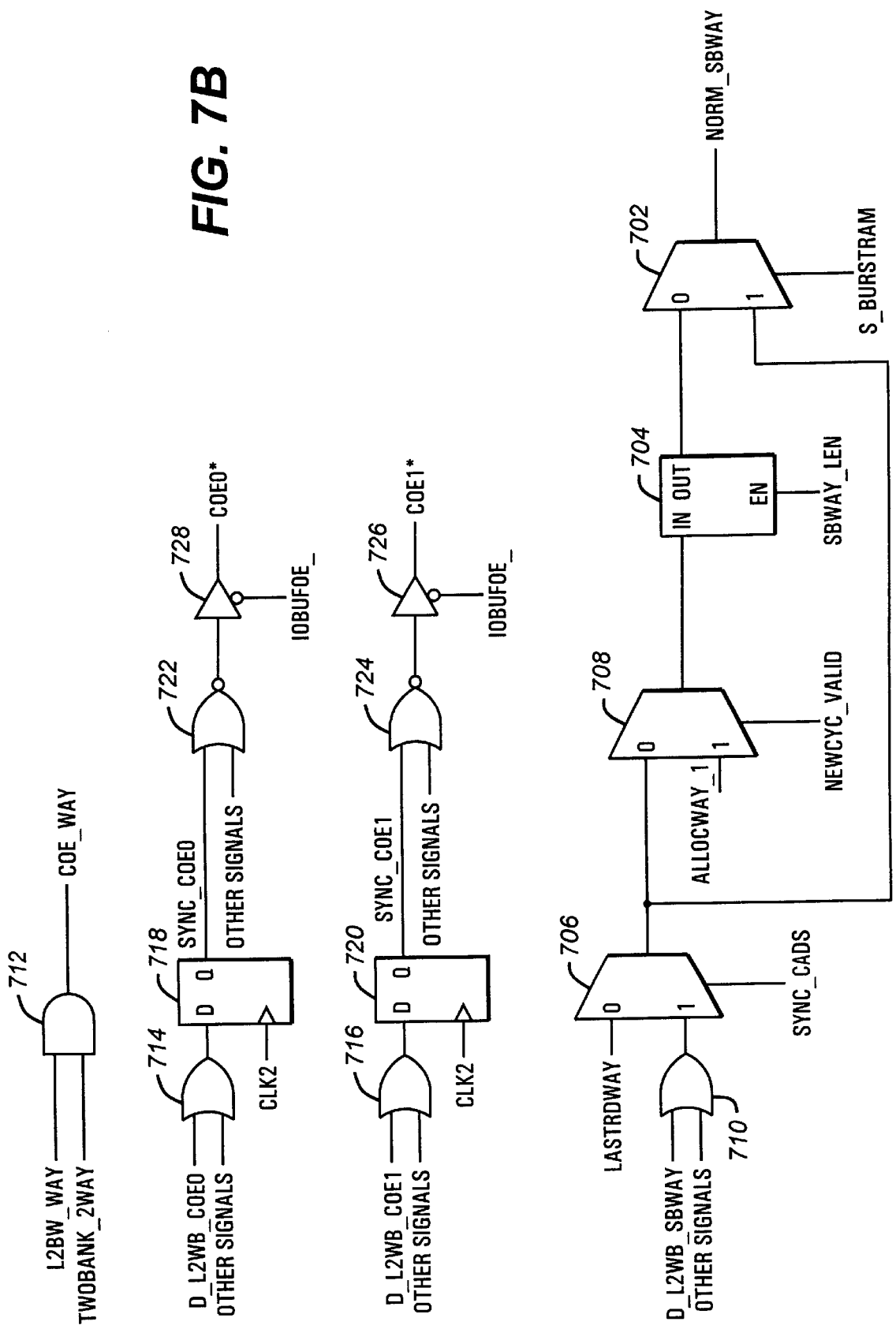

Referring now to FIGS. 7A and 7B, logic is shown for responding to a snoop hit to a modified line in the L2 cache memory 208 when the cache SRAMs 209 are in low power mode. A state machine WBST controls the retrieval of a line of data from the L2 cache memory 208 to write back to the main memory 214. On system reset, the state machine WBST enters into state A, where it remains until a signal L2SNP_WBREQ is asserted high. The signal L2SNP_WBREQ indicates that a hit to a modified line in the L2 cache 208 has occurred in response to a memory cycle initiated by a PCI bus master. This causes the state machine WBST to transition from state A to state G. A signal D_SEL_WBA_TO_PAOUT is asserted high to select the writeback address to drive to the processor address bus PA. The writeback address is a latched version of the PCI address associated with the PCI memory request.

During the snoop cycle, a signal D_MYSNP_PAHOLD is asserted high in the CMC 210. This signal is provided to an input of the OR gate 326 (FIG. 3A) to assert the address hold signal AHOLD. Asserting the address hold signal AHOLD causes the microprocessor 200 to float its address output pins so that the CMC 210 can drive the processor address bus PA with the writeback address.

The state machine WBST remains in state G if a signal Q_P2MWBFULL is asserted high, which indicates that the processor-to-memory queue is is not available for the current writeback cycle. In state G, the output signal L2WB_HOLD_CA is asserted high to latch the writeback address on the processor address bus PA into cache SRAMs 209, if asynchronous SRAMs are used. The signal D_SEL_WBA_TO_PAOUT is also maintained high in state G. Once the processor-to-memory queue becomes available for a writeback request, that is, the signal Q_P2MWBFULL is negated, the state machine WBST transitions from state G to state B. The signal L2WB_HOLD_CA is maintained high to keep the writeback address latched in the SRAMs 209, and the signal D_SEL_WBA_PAOUT is maintained high to continue selecting the writeback address. For synchronous cache SRAMs 209, the signal D_L2WB_CADS is asserted high to strobe the initial burst address into the L2 cache memory 208. The signal D_L2WB_CADS is provided to an input of the OR gate 502, which controls the state of the CADSn* signals. Thus, assertion of the signal D_L2WB_CADS causes the cache SRAMs 209 to come out of low power mode.

In the transition from state G to state B, a signal D_L2WB_SBWAY is equated to a signal L2WB_WAY. If the L2 cache memory 208 is configured as two-way set associative, the signal L2WB_WAY is asserted high if a hit occurs in the tag RAM 232, which corresponds to the second way. The signal D_L2WB_SBWAY is provided to control the state of the chip select signal CCS1* in single-bank two-way set associative mode. The signal CCS1* is effectively an address signal in single-bank two-way mode and performs the way selection in the L2 cache memory 208.

Referring back to FIG. 5, if the L2 cache memory 208 is configured as single-bank two-way set associative, the signals SELB and SELA select one of the 1, 2 or 3 inputs of the multiplexor 536. During the writeback cycle from the L2 cache memory 208 to the main memory 214, the microprocessor 200 is not involved and thus does not assert the address strobe ADS*. As a result, the signal NEWCYC_VALID remains deasserted low. From Table 2 above, it can be seen that if the signal SB2WAY is asserted high and NEWCYC_VALID is deasserted low, then either the 1 or 2 input of the multiplexor 536 is selected. However, since the signal NEW_PADS60_DLY is also driven by the address strobe ADS*, the signal NEW_PADS60_DLY also remains deasserted low. Consequently, during the L2 writeback cycle, the 1 input of the multiplexor 536 is selected.

The 1 input of the multiplexor 536 receives the signal NORM_SBWAY, which is provided by a multiplexor 702. The 0 input of the multiplexor 702 is connected to the output of a latch 704, and its 1 input is connected to the output of a multiplexor 706. The multiplexor 702 is selected by the signal S_BURSTRAM. The input of the latch 704 is connected to the output of a multiplexor 708. The latch 704 latches the state of its input when a signal SBWAY_LEN falls low. The multiplexor 708 is selected by the signal NEWCYC_VALID. Its 0 input is connected to the output of the multiplexor 706, and its 1 input receives the signal ALLOCWAY_I. The 0 input of the multiplexor 706 receives a signal LASTRDWAY, and its 1 input is connected to the output of an OR gate 710. The signal LASTRDWAY is used to perform way prediction in two-way set associative mode. In the preferred embodiment, the predicted way is the way selected in the last read of the L2 cache memory 208. The multiplexor 706 is selected by the signal SYNC_CADS provided by the D flip flop 510 in FIG. 5. The inputs of the OR gate 710 receive signals D_L2VTB_SBWAY and other signals for selecting the fist or second way of the L2 cache memory 208 in other cycles.

Thus, if the signal D_L2WB_SBWAY is asserted high, indicating that the modified line is from the second way of L2 cache memory 208, a high state is passed to the output of the multiplexor 706 when the signal SYNC_CADS is asserted high in response to the assertion of D_L2WB_CADS. If synchronous cache SRAMs 209 are used, the state of the multiplexor 706 output is passed directly through the multiplexor 702 to the signal NORM_SBWAY. If asynchronous cache SRAMs 209 are used, the state of the signal NORM_SBWAY is determined through the multiplexor 708 and the latch 704. In the L2 burst writeback cycle, the signal NEWCYC_VALID remains deasserted. The latching signal SBWAY_LEN provided to the latch 704 is maintained high to allow the input of the multiplexor 708 to be passed to the 0 input of the multiplexor 702 until the signal SYNC_CADS is asserted, which causes the signal SBWAY_LEN to fall low. Thus, for a single-bank two-way set associative L2 cache memory 208, the signal D_L2WB_SBWAY generated by the state machine WBST determines the state of CCS1* during a L2 writeback cycle.

If the L2 cache memory 208 is configured as two-bank two-way associative, both chip select signals CCS0* and CCS1 are maintained low to enable both banks. However, only the outputs of the selected bank of the L2 cache SRAMs 209 are driven. This is accomplished through the use of signal D_L2WB_COE0 and D_L2WB_COE1, respectively. The signal D_L2WB_COE0 is equated with the inverted state of the signal COE_WAY, and the signal D_L2WB_COE1 which is equated to the state of the signal COE_WAY. The signal COE_WAY is provided by an AND gate 712, whose inputs receive the signals L2WB_WAY and TWOBANK_2WAY. As noted above, the signal L2WB_WAY when asserted high indicates a hit to a valid line in the tag RAM 232 during a snoop cycle. Thus, the signal D_L2WB_COE0 is asserted high for a hit to the first way and the signal D_L2WB_COE1 is asserted high for a hit to the second way. The signal D_L2WB_COE0 is provided to an input of an OR gate 714, and the signal D_L2WB_COE1 is provided to an input of an OR gate 716. The outputs of the OR gates 714 and 716 are connected to the D inputs of D flip-flops 718 and 720, respectively. The OR gates 714 and 716 also receive other signals during other cycles requiring a read of the L2 cache memory 208. Both D flip-flops 718 and 720 are clocked by the signal CLK2, and they provide signals SYNC_COE0 and SYNC_COE1. The signal SYNC_COE0 is provided to one input of a NOR gate 722, and the signal SYNC_COE1 is provided to one input of a NOR gate 724. The outputs of the NOR gates 722 and 724 are connected to the inputs of tristate buffers 726 and 728, respectively. The tristate buffers 726 and 728 are enabled by the signal IOBUFOE_ and drive output enable signals COE0* and COE1*, respectively. The signals COE0* and COE1* are connected to the output enable inputs of the first and second banks, respectively, of the cache SRAMs 209. When asserted low, the signal COEn*, n equal to 0 or 1, enables the selected SRAMs in bank n to drive data from the modified line onto the data bus PD.

The state machine WBST transitions from state B to state C on the next rising edge of the signal CLK2. In the transition from state B to state C, the signals L2WB_ HOLD_CA and D_SEL_WBA_TO_PAOUT are maintained high and the signals D_L2WB_COE0 and D_L2WB_COE1 are maintained at their respective states. In addition, the signal D_L2WB_CADV is asserted high, and is provided to one input of the OR gate 666 in FIG. 6B. Assertion of the signal D_L2WB_CADV causes the burst address to be incremented in the cache SRAMs 209 if synchronous SRAMs are used and causes address bits CA[1:0] to be incremented in the CMC 210 if asynchronous SRAMs are used. In the transition from state B to state C, a signal D_L2WB_QPA2MA is asserted high if the microprocessor 200 is a Pentium P54 processor. The signal D_L2WB_QPA2MA notifies the memory controller portion of the CMC 210 to queue the writeback address presented on the processor address bus PA.

Next, the state machine WBST transitions from state C to state D, where the signals L2WB_HOLD_CA and D_L2WB_CADV are maintained high. The signal D_SEL_WBA_TO_PAOUT is equated to the state of a signal MORE_LINES, which indicates if more lines are to be written back from the L2 cache memory 208 to main memory 214. One situation in which the signal MORE_ LINES is asserted high is if a read or write allocate cycle is to a block containing more than one modified line. In this situation, all the modified lines must be written back to the main memory 214 before the allocate cycle can take place.

In the transition from state C to state D, a signal L2WB_ QP2MWB is also asserted high, which causes the memory controller portion of the CMC 210 to queue the data driven by the cache SRAMs 209. The signals D_L2WB_COE0 and D_L2WB_COE1 are maintained at their respective states and the signal D_L2WB_QPA2MA is asserted high.

The reason that the writeback address is queued in each cycle when a Pentium P54 processor is used and queued every other cycle when a Pentium P24 or 486 DX4 is used has to do with the different width of the data bus PD for the two cases. When a Pentium P54 processor is used, the processor data bus PD is 64 bits wide. Otherwise, the data width is 32 bits. The width of the data bus MD is 64 bits. As a result, two write cycles on the 32-bit data bus PD are needed to fill one memory line, whereas there is a one-to-one correspondence between the 64-bit data bus PD and the memory data bus MD.

Additionally, in the transition from state C to state D, the signals L2WB_WORD[1:0] are set to the value 0b00. For a 64-bit processor data bus PD, bits L2WB_WORD[1:0] are provided as the writeback address bits PA[4:3], respectively, to indicate which of the four burst transfers to the main memory 214 is in progress. For a 32-bit data bus PD, the bit L2WB_WORD[1] is provided as the writeback address bit PA[3]. For 32-bit burst transfers, address bits PA[3:2] indicate which of the four transfers is occurring.

From state D, the state machine WBST transitions to state E on the next rising edge of the signal CLK2. In the transition, the signals L2WB_HOLD_CA, L2WB_ QP2MWB, D_L2WB_CADV, D_L2WB_COE0, and D_L2WB_COE1 are maintained at their respective states. The signal D_SEL_WBA_TO_PAOUT is maintained at the state of the signal MORE_LINES. The bits L2WB_ WORD[1:0] are incremented to the value 0b01 to indicate the second burst transfer. If the microprocessor 200 is implemented with a Pentium P54 processor, the signal D_L2WB_QPA2MA is asserted high.

Next, the state machine WBST transitions from state E to state F, where the signals L2WB_HOLD_CA, L2WB_ QP2MWB, D_SEL_WBA_TO_PAOUT, D_L2WB_ CADV, D_L2WB_COE0, and D_L2WB_COE1 are maintained at their respective states. The signal D_L2WB_ QPA2MA is asserted high, and bits L2WB_WORD[1:0] are incremented to the value 0b10 to indicate the third data transfer in the burst writeback cycle. If a signal MORE_ LINES is deasserted low, then a signal L2WB_DONE is asserted high. In the current writeback cycle, only one modified line from the L2 cache memory 208 is written back to the main memory 214. As a result, the signal MORE_ LINES is deasserted low, causing the signal L2WB_DONE to be asserted high.

Next, the state machine WBST transitions from state F to state A if the signal MORE_LINES is low. If MORE_ LINES is high, the state machine WBST transitions to state G to begin the transfer of the next line. The transition from state F to state A causes the signal L2WB_HOLD_CA to be deasserted low to allow a new address from the processor address bus PA to flow into asynchronous cache SRAMs 209. Bits L2WB_WORD[1:0] are incremented to the value 0b11 to indicate the fourth and last data transfer in the burst write back cycle. The signal L2WB_QP2MWB is maintained high, and a signal L2WB_DONE_DLY is asserted high. The signal L2WB_DONE_DLY is asserted high to indicate that the writeback cycle to the main memory 214 has been completed. In the transition from state F to state A, if the signal GREENMODE is asserted high indicating that the microprocessor 200 is in either the stop grant state or the auto halt power down state, then a signal D_L2WB_ GREEN_CADS is asserted high. Referring back to FIG. 5, the signal D_L2WB_GREEN_CADS is provided to inputs of the OR gates 502, 504 and 506, which control the state of the signals SYNC_CADS, SYNC_BLK_CCS0, and SYNC_BLK_CCS1, respectively. Thus, assertion of the signal D_L2WB_GREEN_CADS places the cache SRAMs 209 back into low power mode.

Thus, a circuit has been described for placing an external or L2 cache memory into low power mode in response to certain special cycles executed by the microprocessor. In particular, the special cycles are the stop grant acknowledge special cycle and the halt special cycle. The microprocessor executes the stop grant acknowledge special cycle in response to a request by the computer system to slow down its clock. This request is asserted by the computer system if the system has been idle for a predetermined period of time. The halt special cycle is generated by the microprocessor when a HLT instruction is executed. The stop grant acknowledge and halt special cycles place the microprocessor into a low power state. Since the microprocessor is in low power mode, the L2 cache memory is also placed into low power mode for further power conservation. The L2 cache memory is implemented either with synchronous or asynchronous static random access memories (SRAMs). To place a synchronous SRAM into low power mode, its address strobe input is asserted while its chip select input is deasserted. For an asynchronous SRAM, deasserting its chip select input causes the SRAM to transition into low power mode.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:

a bus;

a main memory array coupled to the bus;

a microprocessor coupled to the bus; and a disk drive coupled to the microprocessor, the disk drive adapted to be spun down to save power:

wherein the microprocessor generates a special cycle responsive to the disk drive being spun down;

a circuit including:
      a cache memory device coupled to the bus, the cache memory device having a chip select input;
      a special cycle decoder coupled to the bus for asserting a first signal if the special cycle is detected; and
      a chip selector coupled to the chip select input of the cache memory device, the chip select generator deasserting the chip select input if the first signal is asserted, wherein the cache memory device is placed into the low power state in response to the chip select signal being deasserted;

wherein the special cycle is a halt special cycle, and wherein the microprocessor generates the halt special cycle on the bus if the microprocessor executes a halt instruction, the halt instruction causing operation of the microprocessor to cease and to place the microprocessor into low power consumption mode.

2. A computer system, comprising:

a bus;

a main memory array coupled to the bus;

a microprocessor coupled to the bus, wherein the microprocessor generates a special cycle; and a circuit including:
      a cache memory device coupled to the bus, the cache memory device having a chip select input;
      a special cycle decoder coupled to the bus for asserting a first signal if the special cycle is detected; and
      a chip selector coupled to the chip select input of the cache memory device, the chip select generator deasserting the chip select input if the first signal is asserted, wherein the cache memory device is placed into the low power state in response to the chip select signal being deasserted;

wherein the special cycle is a halt special cycle, and wherein the microprocessor generates the halt special cycle on the bus if the microprocessor executes a halt instruction, the halt instruction causing operation of the microprocessor to cease and to place the microprocessor into low power consumption mode.

3. A computer system, comprising:

a bus;

a mass storage subsystem coupled to the bus;

a main memory array coupled to the bus;

a microprocessor coupled to the bus, wherein the microprocessor generates a special cycle; and a circuit including:
      a cache memory device coupled to the bus, the cache memory device having a chip select input;
      a special cycle decoder coupled to the bus for asserting a first signal if the special cycle is detected; and
      a chip selector coupled to the chip select input of the cache memory device, the chip select generator deasserting the chip select input if the first signal is asserted, wherein the cache memory device is placed into the low power state in response to the chip select signal being deasserted;

wherein the special cycle is a halt special cycle, and wherein the microprocessor generates the halt special cycle on the bus if the microprocessor executes a halt instruction, the halt instruction causing operation of the microprocessor to cease and to place the microprocessor into low power consumption mode.

4. A method to place a cache memory into a low power state on a computer system incorporating a cache memory, a power management device, and a bus, the method comprising the steps of:

determining if the power management device has provided a power management signal;

responsive to the power management signal being provided, generating a special cycle on the bus; and responsive to the special cycle on the bus, placing the cache memory into a low power state;

wherein the step of generating a special cycle includes generating a stop grant acknowledge special cycle.

5. A method to place a cache memory into a low power state on a computer system incorporating a cache memory, a power management device, and a bus, the method comprising the steps of:

determining if the power management device has provided a power management signal;

responsive to the power management signal being provided, generating a special cycle on the bus; and responsive to the special cycle on the bus, placing the cache memory into a low power state;

wherein the step of generating a special cycle includes generating a halt special cycle.

* * * * *